United States Patent
Kim et al.

(10) Patent No.: US 11,592,982 B2
(45) Date of Patent: Feb. 28, 2023

(54) MEMORY STORAGE DEVICE AND ELECTRONIC DEVICE INCLUDING NONVOLATILE MEMORY

(71) Applicant: Samsung Electronics Co., Ltd., Suwon-si (KR)

(72) Inventors: Jung Hoon Kim, Yongin-si (KR); Seong Hun Kim, Suwon-si (KR); Hong Kug Kim, Yongin-si (KR); Won Jung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 35 days.

(21) Appl. No.: 17/202,817

(22) Filed: Mar. 16, 2021

(65) Prior Publication Data

US 2022/0050593 A1 Feb. 17, 2022

(30) Foreign Application Priority Data

Aug. 11, 2020 (KR) .................. 10-2020-0100407

(51) Int. Cl.
*G06F 12/02* (2006.01)
*G06F 3/06* (2006.01)
*G06N 3/08* (2023.01)

(52) U.S. Cl.
CPC .......... *G06F 3/0604* (2013.01); *G06F 3/0655* (2013.01); *G06F 3/0679* (2013.01);
(Continued)

(58) Field of Classification Search
CPC ............. G06F 12/0246; G06F 12/0253; G06F 2212/7205; G06F 3/0604; G06F 3/0655; G06F 3/0679; G06N 3/08
(Continued)

(56) References Cited

U.S. PATENT DOCUMENTS 8,200,889 B2  6/2012  Kwon et al.
9,355,022 B2  5/2016  Ravimohan et al.
(Continued)

FOREIGN PATENT DOCUMENTS

EP    3644189 A1    4/2020
KR  101247388 B1    3/2013

OTHER PUBLICATIONS

European Search Report dated Jan. 4, 2022, for corresponding European Patent 21186527.4.
(Continued)

*Primary Examiner* — Hashem Farrokh
(74) *Attorney, Agent, or Firm* — Muir Patent Law, PLLC

(57) ABSTRACT

An electronic device comprising a nonvolatile memory, a memory controller configured to control the nonvolatile memory, and a host connected to the memory controller. In response to a first write signal received from the host, the memory controller is configured to provide the first write signal to the nonvolatile memory, the nonvolatile memory is configured to perform a write operation based on the provided first write signal, generate first metadata based on a result of performing the write operation, and provide the generated first metadata to the host. The host is configured to determine whether to perform garbage collection for the nonvolatile memory using a neural network model trained based on the provided first metadata or the first write signal, provide a garbage collection request signal to the memory controller in response to determining to perform garbage collection.

20 Claims, 25 Drawing Sheets

(52) U.S. Cl.
CPC .......... *G06F 12/0253* (2013.01); *G06N 3/08* (2013.01); *G06F 2212/7205* (2013.01)

(58) Field of Classification Search
USPC .................................. 711/154, 103
See application file for complete search history.

(56) References Cited

U.S. PATENT DOCUMENTS

| | | | |
|---|---|---|---|
| 9,690,655 B2 | 6/2017 | Tabrizi et al. | |
| 9,690,700 B2 | 6/2017 | Choi et al. | |
| 9,740,437 B2 | 8/2017 | Mielke et al. | |
| 10,339,001 B2 | 7/2019 | Tabrizi et al. | |
| 10,430,083 B2 | 10/2019 | Kim et al. | |
| 10,896,126 B2* | 1/2021 | Kim | G06F 12/0253 |
| 2019/0140659 A1* | 5/2019 | Kim | G06F 11/1048 |
| 2019/0310935 A1 | 10/2019 | Shuster et al. | |
| 2019/0361608 A1 | 11/2019 | Kim | |
| 2020/0042438 A1 | 2/2020 | Yi et al. | |
| 2020/0104254 A1 | 4/2020 | Lee | |
| 2020/0133845 A1* | 4/2020 | Kim | G06F 12/0246 |
| 2020/0310966 A1* | 10/2020 | Lee | G06F 12/0246 |
| 2021/0072901 A1* | 3/2021 | Kale | G06N 3/049 |

OTHER PUBLICATIONS

Office Action from the European Patent Office dated Jan. 14, 2022, for corresponding European Patent 21186527 4.

* cited by examiner

FIG. 11 nth block
(ADDRn)

| Time | t-3 | t-2 | t-1 | t |
|---|---|---|---|---|
| FBC | 100 | 70 | 40 | ? |

(FBC criteria for Garbage Collection : under 20)

FIG. 16 nth block
(ADDRn)

| Time  | t-3 | t-2 | t-1 | t |
|-------|-----|-----|-----|---|
| LBA_AC | 0   | 30  | 60  | ? |

(LBA_AC criteria for Garbage Collection : above 80)

FIG. 20

| BLK NO | time | t-3 | t-2 | t-1 | t | GC condition? | GC perform? |
|---|---|---|---|---|---|---|---|
| nth BLK | FBC | 70 | 50 | 30 | 10 | O | O |
| | LBA_AC | 0 | 20 | 40 | 60 | X | |
| (n+1)th BLK | FBC | 100 | 70 | 40 | 10 | O | O |
| | LBA_AC | 0 | 30 | 60 | 90 | O | |
| (n+2)th BLK | FBC | 100 | 80 | 60 | 40 | X | X |
| | LBA_AC | 0 | 20 | 40 | 60 | X | |

(FBC criteria for Garbage Collection : under 20)
(LBA_AC criteria for Garbage Collection : above 80)

MEMORY STORAGE DEVICE AND ELECTRONIC DEVICE INCLUDING NONVOLATILE MEMORY

CROSS-REFERENCE TO RELATED APPLICATION

This application claims priority from Korean Patent Application No. 10-2020-0100407 filed on Aug. 11, 2020 in the Korean Intellectual Property Office, and all the benefits accruing therefrom under 35 U.S.C. 119, the contents of which in its entirety are herein incorporated by reference.

BACKGROUND

1. Technical Field

The present disclosure relates to a memory storage device and an electronic device including a nonvolatile memory. More particularly, the present disclosure relates to a memory storage device and an electronic device that perform garbage collection.

2. Description of the Related Art

Semiconductor memory devices include volatile memory devices and nonvolatile memory devices. The volatile memory devices may lose their stored contents when powered off, while they have high read and write speeds. Conversely, since the nonvolatile memory devices retain their stored contents even when powered off, the nonvolatile memory devices are used to store contents that need to be maintained regardless of whether power is supplied or not.

For example, the volatile memory device includes a static RAM (SRAM), a dynamic RAM (DRAM), a synchronous DRAM (SDRAM), or the like. The nonvolatile memory devices retain their stored contents even when powered off. For example, the nonvolatile memory devices include a read only memory (ROM), a programmable ROM (PROM), an electrically programmable ROM (EPROM), an electrically erasable and programmable ROM (EEPROM), a flash memory, a phase change RAM (PRAM), a magnetic RAM (MRAM), a resistive RAM (RRAM), a ferroelectric RAM (FRAM), and the like. Flash memories may be classified into NOR flash memory and NAND flash memory.

In particular, a flash memory device has an advantage of being able to be implemented as, for example, a highly integrated auxiliary mass storage device when compared to a general EEPROM.

Various memory systems are being produced using the flash memory. The memory systems may store data into or read data from the flash memory through a protocol.

The flash memory may perform garbage collection to secure a free block.

Depending on the timing of performing such garbage collection, the performance of the flash memory may rapidly deteriorate, so a method of controlling this phenomenon is required.

SUMMARY

Aspects of the present disclosure provide an electronic device capable of improving the performance of a nonvolatile memory by predicting a time period when garbage collection is performed.

Aspects of the present disclosure also provide a memory storage device capable of improving the performance of a nonvolatile memory by predicting a time period when garbage collection is performed.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

Specific details of other embodiments are included in the detailed description and drawings.

According to an aspect of the present disclosure, there is provided an electronic device comprising a nonvolatile memory; a memory controller configured to control the nonvolatile memory; and a host connected to the memory controller, wherein in response to a first write signal received from the host, the memory controller is configured to provide the first write signal to the nonvolatile memory, the nonvolatile memory is configured to perform a first write operation based on the provided first write signal, generate first metadata based on a result of performing the first write operation, and provide the generated first metadata to the host, the host is configured to determine whether to perform garbage collection for the nonvolatile memory using a neural network model trained based on the provided first metadata or the first write signal, and the host is configured to provide a garbage collection request signal to the memory controller in response to determining to perform garbage collection.

According to an aspect of the present disclosure, there is provided an memory storage device comprising: a nonvolatile memory; and a memory controller configured to control the nonvolatile memory, wherein the memory controller is configured to provide a first write command, an address and data to the nonvolatile memory, the memory controller is configured to receive metadata from the nonvolatile memory in response to the first write command, the memory controller is configured to determine whether to perform garbage collection for the nonvolatile memory using a neural network model trained based on the received metadata, and the memory controller is configured to provide a second write command, an erase command, and the address to the nonvolatile memory in response to determining to perform garbage collection.

According to an aspect of the present disclosure, there is provided an electronic device comprising: a nonvolatile memory; a memory controller configured to control the nonvolatile memory; and a host connected to the memory controller, wherein in response to a first write signal received from the host, the memory controller is configured to provide the first write signal to the nonvolatile memory, the nonvolatile memory is configured to perform a write operation based on the provided first write signal, generate metadata based on a result of performing the write operation, and provide the generated metadata to the host, the metadata indicates the number of free blocks included in the nonvolatile memory, and the host is configured to provide a garbage collection request signal to the memory controller in response to the provided metadata.

BRIEF DESCRIPTION OF THE DRAWINGS

The above and other aspects and features of the present disclosure will become more apparent by describing in detail exemplary embodiments thereof with reference to the attached drawings, in which:

FIGS. 11 to 14 are diagrams illustrating a garbage collection prediction operation using a neural network, according to some embodiments.

FIGS. 16 to 18 are diagrams illustrating a garbage collection prediction operation using a neural network, according to some embodiments.

FIGS. 20 and 21 are diagrams illustrating a garbage collection prediction operation using a neural network, according to some embodiments.

DETAILED DESCRIPTION OF THE EMBODIMENTS

Hereinafter, embodiments according to the technical spirit of the present disclosure will be described with reference to the accompanying drawings.

Hereinafter, an electronic device 1 including a host 100, a memory controller 200, and a nonvolatile memory 300 will be described with reference to FIGS. 1 to 3.

Figure 1:
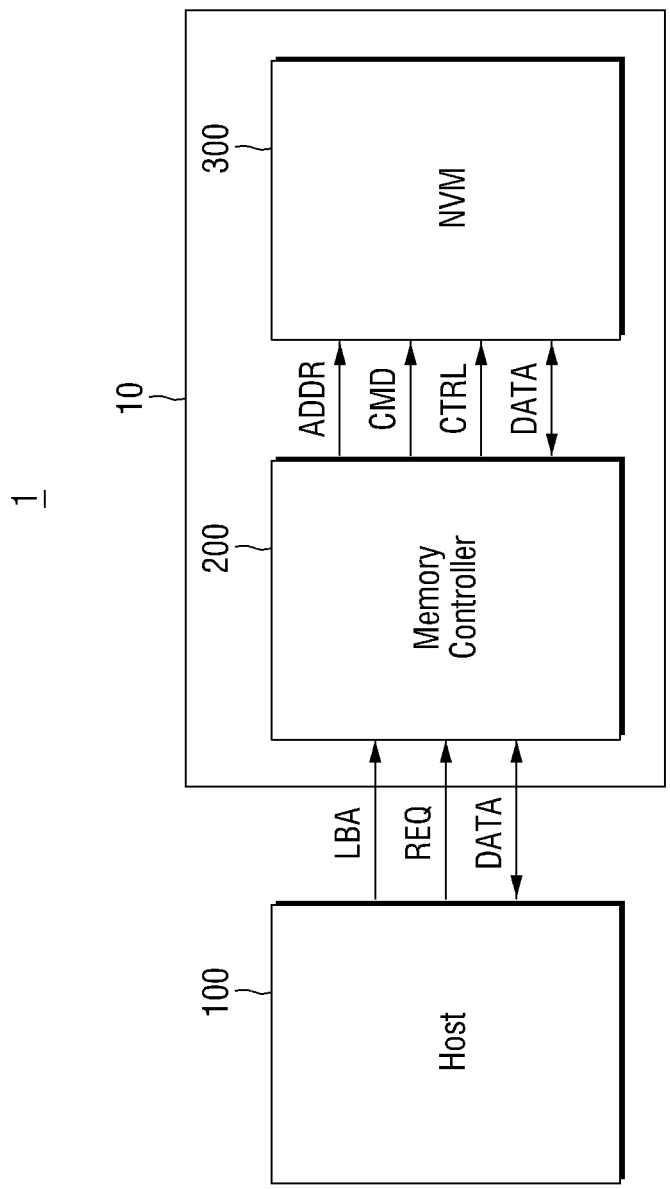
FIG. 1 is a perspective view illustrating an electronic device according to some embodiments.

FIG. 1 is a perspective view illustrating an electronic device according to some embodiments. FIG. 2 is a block diagram illustrating a memory controller of FIG. 1. FIG. 3 is a block diagram illustrating a nonvolatile memory of FIG. 1.

Referring to FIG. 1, the electronic device 1 may include the host 100 and a memory storage device 10. The host 100 and the memory storage device 10 may be electrically connected. The host 100 may provide a logical block address LBA and a request signal REQ to the memory storage device 10, and exchange data DATA with the memory storage device 10. For example, the host 100 may be connected to the memory controller 200.

The host 100 may include, for example, a personal computer (PC), a laptop, a mobile phone, a smart phone, a tablet PC, or the like.

The memory storage device 10 may include the memory controller 200 and the nonvolatile memory 300. The memory storage device 10 may be integrated into one semiconductor device. For example, the memory storage device 10 may include an embedded universal flash storage (UFS) memory device, an embedded multi-media card (eMMC), a solid state drive (SSD), or the like. In addition, for example, the memory storage device 10 may include a removable UFS memory card, a compact flash (CF) card, a secure digital (SD) card, a micro-SD card, a mini-SD card, an extreme digital (xD) card, a memory stick, or the like.

The nonvolatile memory 300 may include a NAND flash memory. However, embodiments according to the technical spirit of the present disclosure are not limited thereto, and the nonvolatile memory 300 may include a NOR flash memory, or a phase-change RAM (PRAM), a magneto resistive RAM (MRAM), a resistive memory such as a ferroelectric RAM (FeRAM) and a resistive RAM (RRAM).

The memory controller 200 may be connected to the nonvolatile memory 300 to control the nonvolatile memory 300. For example, in response to the logical block address LBA, the request signal REQ, and the like received from the host 100, the memory controller 200 may provide an address ADDR, a command CMD, a control signal CTRL, and the like to the nonvolatile memory 300. The memory controller 200 may provide signals to the nonvolatile memory 300 to control writing or reading of data to or from the nonvolatile memory 300. In addition, the memory controller 200 and the nonvolatile memory 300 may exchange data DATA.

Figure 2:
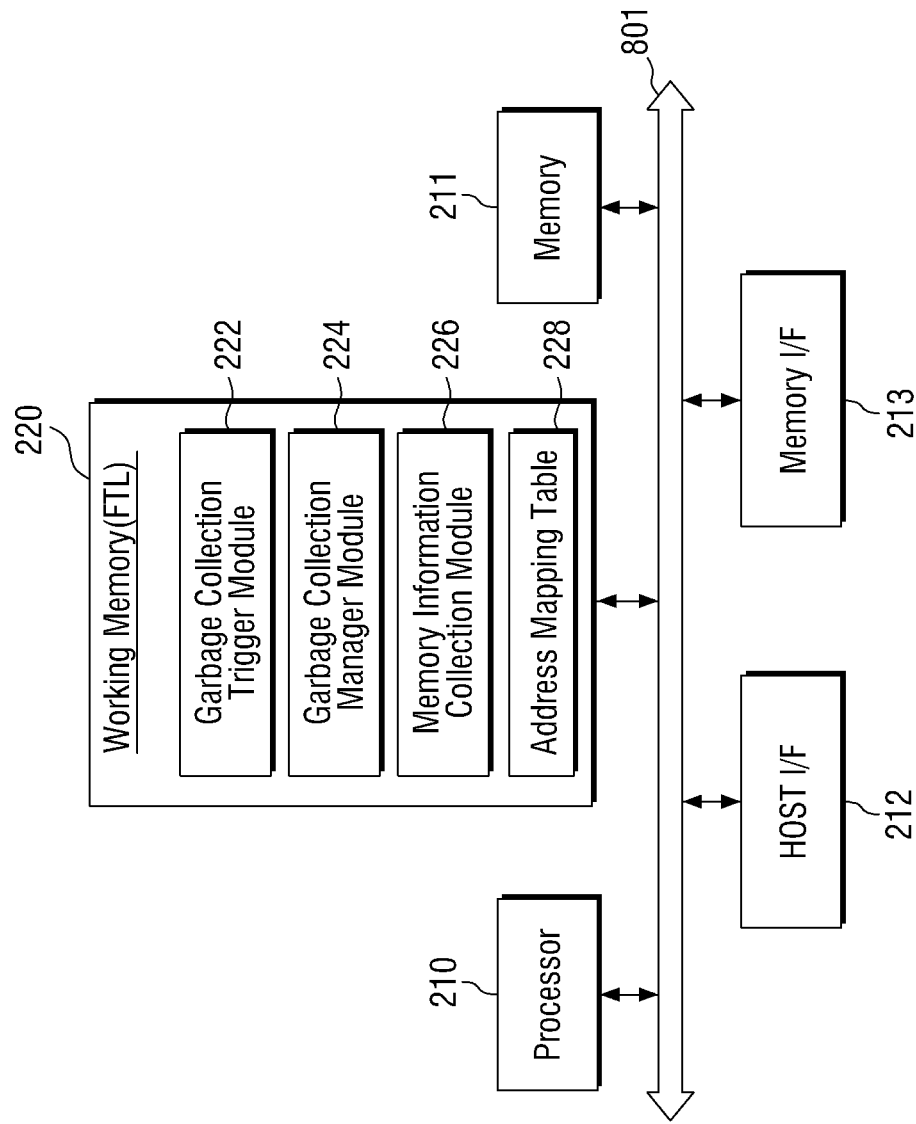
FIG. 2 is a block diagram illustrating a memory controller of FIG. 1.

Referring to FIG. 2, the memory controller 200 may include a processor 210, a memory 211, a host interface 212, a memory interface 213, and a working memory 220.

The processor 210 may include a central processing unit (CPU), a controller, an application specific integrated circuit (ASIC), or the like. The processor 210 may control the overall operation of the memory controller 200. The processor 210 may control the memory controller 200 by driving firmware loaded in the working memory 220.

The memory 211 may store code data required for initial booting of the memory storage device 10.

The memory controller 200 and the host 100 may be connected through the host interface 212. For example, the data DATA may be transmitted and received through the host interface 212. The host interface 212 may include an advanced technology attachment (ATA), a serial ATA (SATA), an external SATA (e-SATA), a universal serial bus (USB), or the like.

The memory controller 200 and the nonvolatile memory 300 may be connected through the memory interface 213. For example, the data DATA, the control signal CTRL, the address ADDR, the command CMD, and the like may be transmitted and received through the memory interface 213. The working memory 220 may be implemented as a cache memory, a DRAM, a SRAM, a flash memory, or the like.

The working memory 220 may include a flash translation layer (FTL). The FTL may include system software that manages write, read, and erase operations and the like of the nonvolatile memory 300. For example, the process of converting the logical address into the physical address may be performed in the FTL. The FTL may include firmware. The FTL may be loaded into the working memory 220. The firmware of the FTL may be executed by the processor 210.

The working memory 220 may include a garbage collection trigger module 222, a garbage collection manager module 224, a memory information collection module 226, and an address mapping table 228. A "module" may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors.

The working memory 220 may convert the logical block address LBA into the address ADDR using the address mapping table 228 and provide it to the nonvolatile memory 300. The working memory 220 may perform management on memory cells of the nonvolatile memory 300. For example, the working memory 220 may perform garbage collection and bad block management operations on blocks of a memory cell array 310 of the nonvolatile memory 300. A block may correspond to the minimum unit of erase (e.g., a region of memory whose memory cells may be erased together in the same erase operation, where portions of such region are not erased separately).

The memory controller 200 may control garbage collection of the nonvolatile memory 300 using the garbage collection trigger module 222, the garbage collection manager module 224, and the like. For example, the garbage collection trigger module 222 may provide a garbage collection trigger signal to the garbage collection manager module 224 in response to a garbage collection request. For example, the garbage collection manager module 224 may control the garbage collection of the nonvolatile memory 300 using metadata or the like.

As data is continuously written to flash memory, valid data may be scattered throughout the nonvolatile memory 300. Free blocks are blocks of the nonvolatile memory 300 that have no device valid data. A free block count represents the quantitative value of free blocks (e.g., the number of free blocks) of the nonvolatile memory 300. Garbage collection is a process for securing a free block in the nonvolatile memory 300. Since the unit of writing data is a page, and the unit of erasing data is a block, a method for adjusting the same is required. Therefore, through the garbage collection, a valid page is written to another block and a block including the valid page is erased, thereby securing a free block.

The garbage collection may improve the performance of the memory storage device 10.

Figure 3:
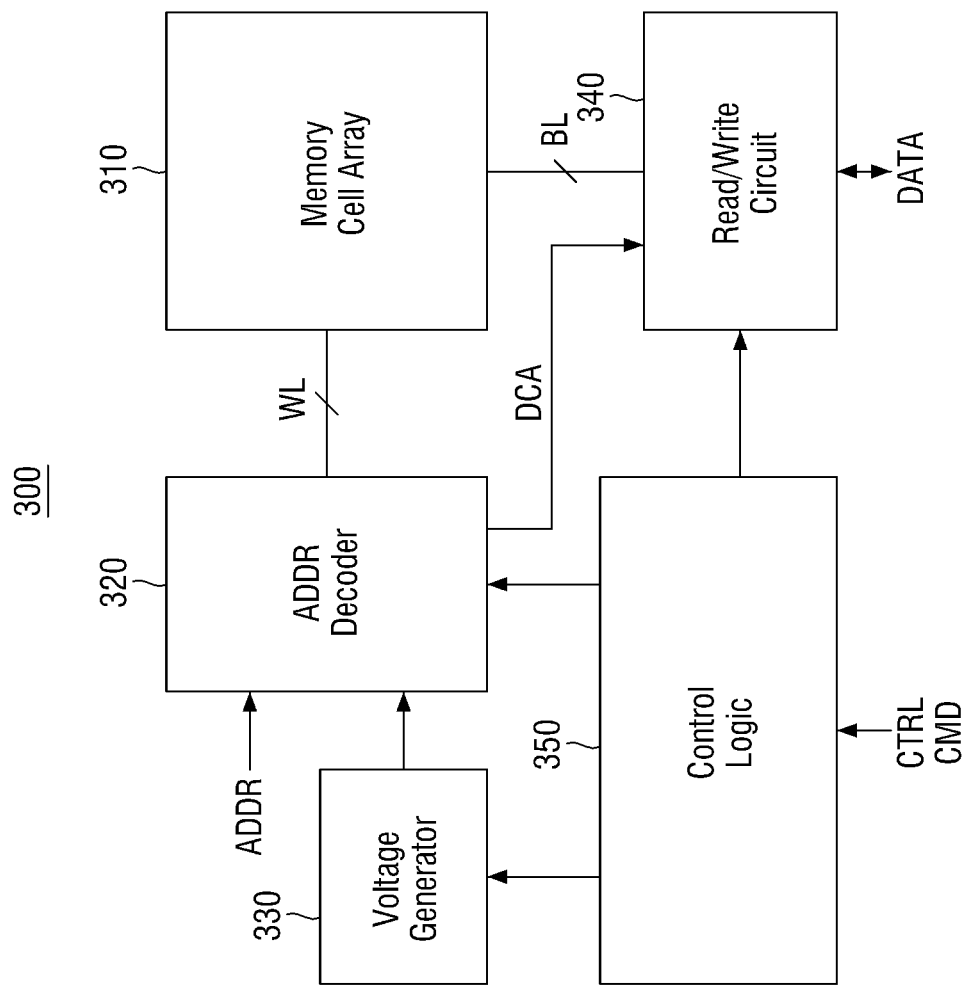
FIG. 3 is a block diagram illustrating a nonvolatile memory of FIG. 1.

Referring to FIG. 3, the nonvolatile memory 300 may include a memory cell array 310, an address decoder 320, a voltage generator 330, a read/write circuit 340, a control logic 350, and the like.

The memory cell array 310 may be connected to the address decoder 320 through word lines WL. The memory cell array 310 may be connected to the read/write circuit 340 through bit lines BL. The memory cell array 310 may include a plurality of memory cells. For example, the memory cells arranged in a row direction may be connected to the word line WL. For example, the memory cells arranged in a column direction may be connected to the bit line BL.

The address decoder 320 may be connected to the memory cell array 310 through the word lines WL. The address decoder 320 may operate under the control of the control logic 350. The address decoder 320 may receive the address ADDR from the memory controller 200. The address decoder 320 may receive from the voltage generator 330 a voltage required for an operation such as program or read.

The address decoder 320 may decode a row address among the received addresses ADDR. The address decoder 320 may select the word line WL using the decoded row address. A decoded column address DCA may be provided to the read/write circuit 340. For example, the address decoder 320 may include a row decoder, a column decoder, an address buffer, and the like.

The voltage generator 330 may generate a voltage required for an access operation under the control of the control logic 350. For example, the voltage generator 330 may generate a program voltage and a program verification voltage which are required to perform a program operation. For example, the voltage generator 330 may generate read voltages required to perform a read operation, and generate an erase voltage and an erase verification voltage required to perform an erase operation. In addition, the voltage generator 330 may provide a voltage required to perform each operation to the address decoder 320.

The read/write circuit 340 may be connected to the memory cell array 310 through the bit lines BL. The read/write circuit 340 may exchange the data DATA with the memory controller 200. The read/write circuit 340 may operate under the control of the control logic 350. The read/write circuit 340 may receive the decoded column address DCA from the address decoder 320. The read/write circuit 340 may select the bit line BL using the decoded column address DCA.

For example, the read/write circuit 340 may program the received data DATA into the memory cell array 310. The read/write circuit 340 may read data from the memory cell array 310 and provide the read data to the outside (e.g., the memory controller 200). For example, the read/write circuit 340 may include components such as a sense amplifier, a write driver, a column select circuit, a page buffer, and the like.

The control logic 350 may be connected to the address decoder 320, the voltage generator 330, and the read/write circuit 340. The control logic 350 may control the operation of the nonvolatile memory 300. The control logic 350 may operate in response to the control signal CRTL and the command CMD (e.g., write command and read command) provided from the memory controller 200. The control logic 350 may perform the garbage collection for the memory cell array 310 under the control of the memory controller 200.

Figure 4:
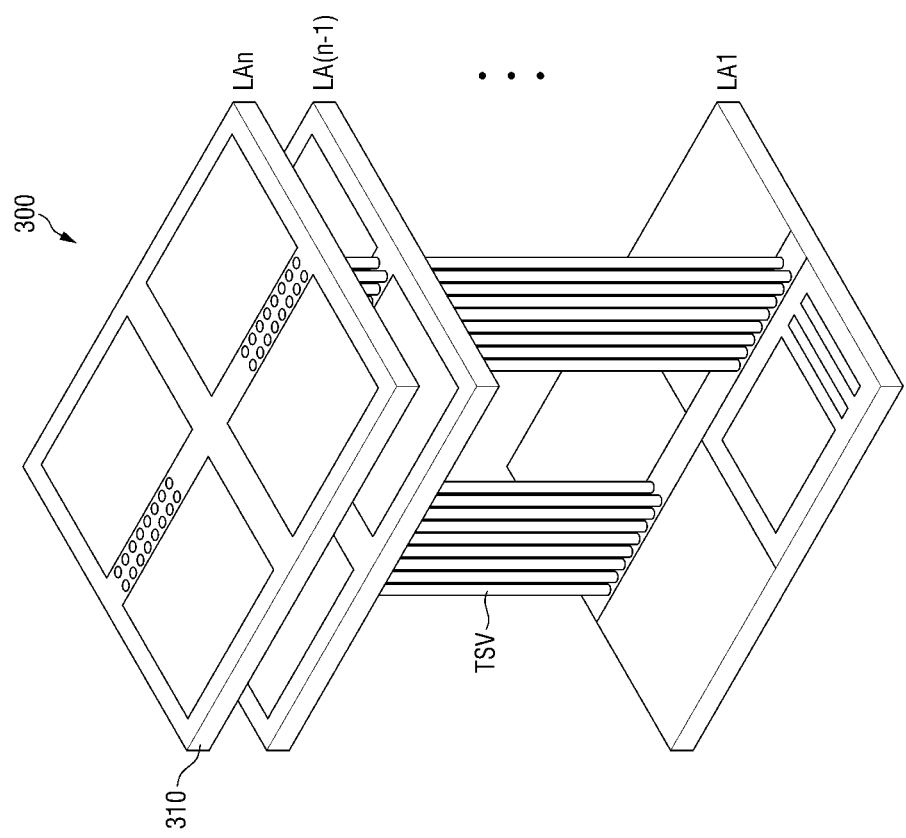
FIG. 4 is an exemplary block diagram illustrating a nonvolatile memory device according to some embodiments.

FIG. 4 is an exemplary block diagram illustrating a nonvolatile memory device according to some embodiments.

Referring to FIGS. 3 and 4, the nonvolatile memory 300 according to some embodiments may include a plurality of semiconductor layers LA1 to LAn. Each of the plurality of semiconductor layers LA1 to LAn may be a memory chip (e.g., DRAM memory chip). Alternatively, some of the plurality of semiconductor layers LA1 to LAn may be master chips that perform interfacing with an external device (e.g., the host 100 of FIG. 1), and the rest of them may be slave chips that store data.

For example, an $n^{th}$ layer LAn and a first layer LA1 of the nonvolatile memory 300 may be semiconductor chips including the memory cell array 310. The plurality of semiconductor layers LA1 to LAn may transmit and receive signals to and from each other through a through silicon via TSV. The configuration and arrangement of the nonvolatile memory 300 according to some embodiments are not limited thereto.

Figure 5:
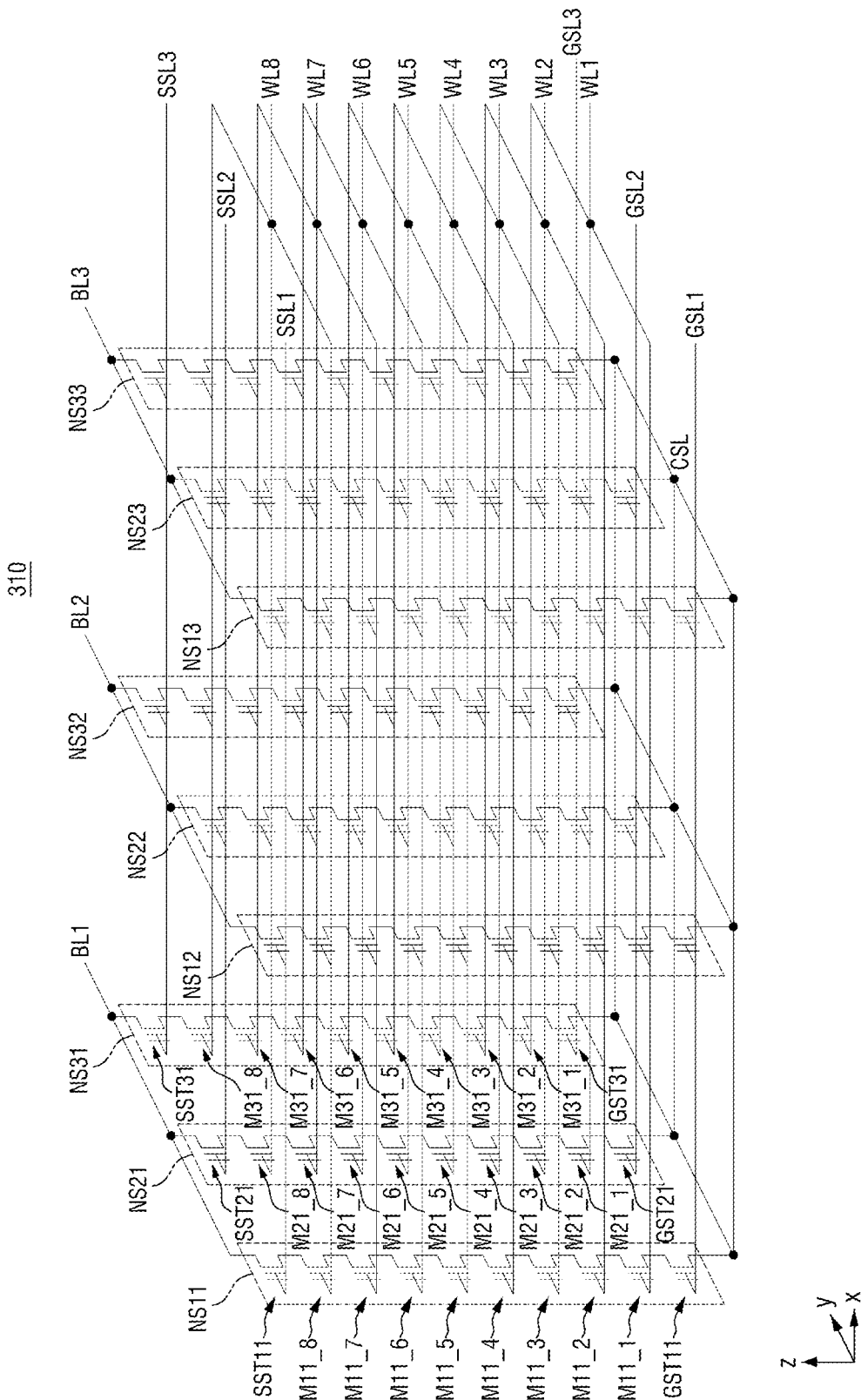
FIG. 5 is an exemplary circuit diagram illustrating a memory cell array according to some embodiments.

FIG. 5 is an exemplary circuit diagram illustrating a memory cell array according to some embodiments.

Referring to FIG. 5, a plurality of cell strings NS11, NS21, NS31, NS12, NS22, NS32, NS13, NS23, and NS33 may be arranged in a first direction x and a second direction y on a substrate (not shown). The plurality of cell strings NS11, NS21, NS31, NS12, NS22, NS32, NS13, NS23, and NS33 may have a shape extending in a third direction z. The plurality of cell strings NS11, NS21, NS31, NS12, NS22, NS32, NS13, NS23, and NS33 may be connected in common to a common source line CSL formed on or in the substrate (not shown). The common source line CSL is shown as being connected to the lowermost end of the plurality of cell strings NS11, NS21, NS31, NS12, NS22, NS32, NS13, NS23, and NS33 in the third direction z. However, it is sufficient that the common source line CSL is electrically connected to the lowermost end of the plurality of cell strings NS11, NS21, NS31, NS12, NS22, NS32, NS13, NS23, and NS33 in the third direction z, and the common source line CSL is not limited to being physically located at the lower end of the plurality of cell strings NS11, NS21, NS31, NS12, NS22, NS32, NS13, NS23, and NS33. In addition, the plurality of cell strings NS11, NS21, NS31, NS12, NS22, NS32, NS13, NS23, and NS33 are shown to be arranged in a 3×3 array in this drawing, but the arrangement shape and the number of the plurality of cell strings arranged in the memory cell array 310 of the nonvolatile memory are not limited thereto.

Cell strings NS11, NS12, and NS13 may be connected to a first ground select line GSL1 Cell strings NS21, NS22, and NS23 may be connected to a second ground select line GSL2. Cell strings NS31, NS32, and NS33 may be connected to a third ground select line GSL3.

In addition, cell strings NS11, NS12, and NS13 may be connected to a first string select line SSL1. Cell strings NS21, NS22, and NS23 may be connected to a second string select line SSL2. Cell strings NS31, NS32, and NS33 may be connected to a third string select line SSL3.

Each of the plurality of cell strings NS11, NS21, NS31, NS12, NS22, NS32, NS13, NS23, and NS33 may include a string select transistor SST connected to each of the string select lines. In addition, each of the plurality of cell strings NS11, NS21, NS31, NS12, NS22, NS32, NS13, NS23, and NS33 may include a ground select transistor GST connected to each of the ground select lines.

One end of the ground select transistor in each of the plurality of cell strings NS11, NS21, NS31, NS12, NS22, NS32, NS13, NS23, and NS33 may be connected to the common source line CSL. In addition, each of the plurality of cell strings NS11, NS21, NS31, NS12, NS22, NS32, NS13, NS23, and NS33 may have a plurality of memory cells sequentially stacked in the third direction z between the ground select transistor and the string select transistor. Although not shown in the drawing, each of the plurality of cell strings NS11, NS21, NS31, NS12, NS22, NS32, NS13, NS23, and NS33 may include dummy cells between the ground select transistor and the string select transistor. In addition, the number of the string select transistors included in each string is not limited to this drawing.

For example, the cell string NS11 may include a ground select transistor GST11 disposed at the lowermost end in the third direction z, a plurality of memory cells M11_1 to M11_8 sequentially stacked on the ground select transistor GST11 in the third direction z, and a string select transistor SST11 stacked on the uppermost memory cell M11_8 in the third direction z. In addition, the cell string NS21 may include a ground select transistor GST21 disposed at the lowermost end in the third direction z, a plurality of memory cells M21_1 to M21_8 sequentially stacked on the ground select transistor GST21 in the third direction z, and a string select transistor SST21 stacked on the uppermost memory cell M21_8 in the third direction z. In addition, the cell string NS31 may include a ground select transistor GST31 disposed at the lowermost end in the third direction z, a plurality of memory cells M31_1 to M31_8 sequentially stacked on the ground select transistor GST31 in the third direction z, and a string select transistor SST31 stacked on the uppermost memory cell M31_8 in the third direction z. The configuration of the other strings may also be similar thereto.

The memory cells positioned at the same height in the third direction z from the substrate (not shown) or the ground select transistor may be electrically connected in common through each word line. For example, the memory cells formed at the same height as the memory cells M11_1, M21_1, and M31_1 may be connected to a first word line WL1. In addition, the memory cells formed at the same height as the memory cells M11_2, M21_2, and M31_2 may be connected to a second word line WL2. Hereinafter, since the arrangement and structure of the memory cells connected to a third word line WL3 to an eighth word line WL8 are similar to the above, a description thereof will be omitted.

One end of each string select transistor of the plurality of cell strings NS11, NS21, NS31, NS12, NS22, NS32, NS13, NS23, and NS33 may be connected to a bit line BL1, BL2, or BL3. For example, the string select transistors SST11, SST21, and SST31 may be connected to the bit line BL1 extending in the second direction y. A description of the other string select transistors connected to the bit lines BL2 or BL3 is also similar to the above, and thus a description thereof will be omitted.

The memory cells corresponding to one string (or ground) select line and one word line may form one page. A write operation and a read operation may be performed on a page basis. Each of the memory cells in each page may store two or more bits. Bits written to the memory cells of each page may form logical pages.

The memory cell array 310 may be provided as a three-dimensional memory array. The three-dimensional memory array may be monolithically formed on one or more physical levels of arrays of the memory cells having an active area disposed on a substrate (not shown) and a circuit involved in the operation of the memory cells. The circuit involved in the operation of the memory cells may be located within or on the substrate. Being monolithically formed means that layers of each level of the three-dimensional array may be deposited directly on the lower level layers of the three-dimensional array. Alternatively, the circuit involved in the operation of the memory cells may be connected to a contact portion of the uppermost end in the third direction z. This will be described in detail with reference to FIG. 6.

Figure 6:
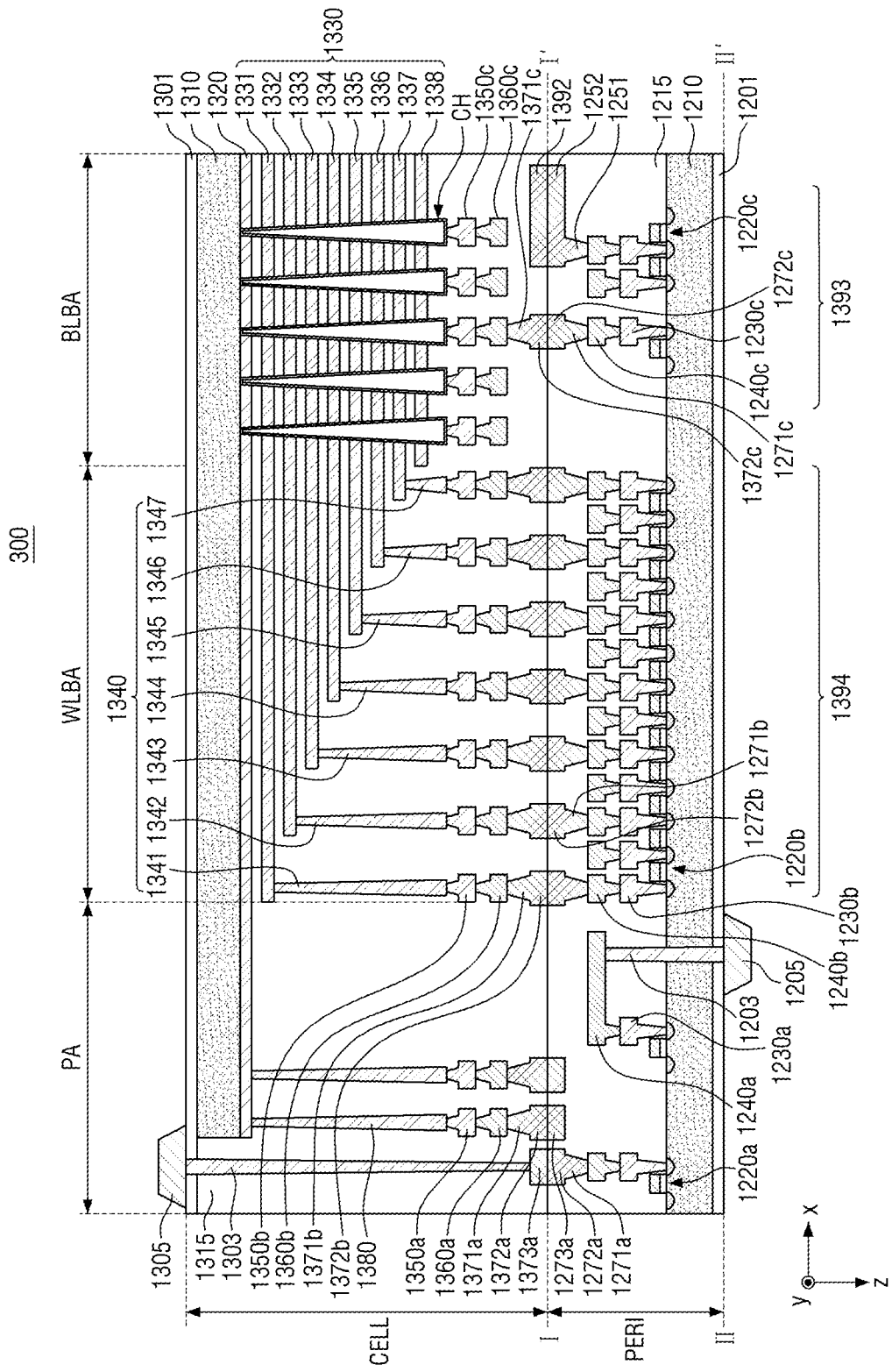
FIG. 6 is an exemplary diagram schematically illustrating an inside of a nonvolatile memory according to some embodiments.

FIG. 6 is an exemplary diagram schematically illustrating an inside of a nonvolatile memory according to some embodiments.

Referring to FIG. 6, the nonvolatile memory 300 according to some embodiments may have a chip to chip (C2C) structure. In this drawing, a cell region CELL of the nonvolatile memory 300 may correspond to the memory cell array 310 of FIG. 5.

The C2C structure may include a structure obtained by manufacturing an upper chip including a cell region CELL on a first wafer, manufacturing a lower chip including a peripheral circuit region PERI on a second wafer different from the first wafer, and connecting the upper chip and the lower chip to each other by a bonding method. In one example, the bonding method may include a method of electrically connecting a bonding metal formed on an uppermost metal layer of the upper chip to a bonding metal formed on an uppermost metal layer of the lower chip. For example, when the bonding metal is formed of copper (Cu), the bonding method may be a Cu—Cu bonding method, and the bonding metal may also be formed of aluminum or tungsten.

The peripheral circuit region PERI and the cell region CELL of the nonvolatile memory 300 according to some embodiments may each include an external pad bonding area PA, a word line bonding area WLBA, and a bit line bonding area BLBA.

The peripheral circuit region PERI may include a first substrate 1210, an interlayer insulating layer 1215, a plurality of circuit elements 1220a, 1220b, and 1220c formed on the first substrate 1210, a first metal layer 1230a, 1230b, and 1230c connected to each of the plurality of circuit elements 1220a, 1220b, and 1220c, and a second metal layer 1240a, 1240b, and 1240c formed on the first metal layer 1230a, 1230b, and 1230c. In one embodiment, the first metal layer 1230a, 1230b, and 1230c may be formed of tungsten having a relatively high resistance, and the second metal layer 1240a, 1240b, and 1240c may be formed of copper having a relatively low resistance.

In the present disclosure, only the first metal layer 1230a, 1230b, and 1230c and the second metal layer 1240a, 1240b, and 1240c are illustrated and described, but the present disclosure is not limited thereto, and one or more metal layers may be further formed on the second metal layer 1240a, 1240b, and 1240c. At least some of the one or more metal layers formed on the second metal layer 1240a, 1240b, and 1240c may be formed of aluminum or the like having a lower resistance than copper forming the second metal layer 1240a, 1240b, and 1240c.

The interlayer insulating layer 1215 may be disposed on the first substrate 1210 to cover the plurality of circuit elements 1220a, 1220b, and 1220c, the first metal layer 1230a, 1230b, and 1230c, and the second metal layer 1240a, 1240b, and 1240c, and may include an insulating material such as silicon oxide or silicon nitride.

Lower bonding metals 1271b and 1272b may be formed on the second metal layer 1240b in the word line bonding area WLBA. In the word line bonding area WLBA, the lower bonding metals 1271b and 1272b of the peripheral circuit region PERI may be electrically connected to upper bonding metals 1371b and 1372b of the cell region CELL by a bonding method. The lower bonding metals 1271b and 1272b and the upper bonding metals 1371b and 1372b may be formed of aluminum, copper, tungsten, or the like.

The cell region CELL may provide at least one memory block. The cell region CELL may include a second substrate 1310 and a common source line 1320 (corresponding to CSL of FIG. 5). On the second substrate 1310, a plurality of word lines 1330 (1331 to 1338, corresponding to WL1 to WL8 of FIG. 5) may be stacked along the third direction z perpendicular to the top surface of the second substrate 1310. String select lines and a ground select line may be disposed above and below the word lines 1330, respectively, and the plurality of word lines 1330 may be disposed between the string select lines and the ground select line.

In the bit line bonding area BLBA, a channel structure CH may extend in a direction perpendicular to the top surface of the second substrate 1310 to penetrate the word lines 1330, the string select lines, and the ground select line. The channel structure CH may include a data storage layer, a channel layer, a buried insulating layer, and the like. The channel layer may be electrically connected to a first metal layer 1350c and a second metal layer 1360c. For example, the first metal layer 1350c may be a bit line contact, and the second metal layer 1360c may be a bit line (corresponding to BL1 to BL3 of FIG. 5). In one embodiment, the bit line 1360c may extend along the second direction y parallel to the top surface of the second substrate 1310.

In one embodiment illustrated in FIG. 6, an area in which the channel structure CH and the bit line 1360c are disposed may be defined as the bit line bonding area BLBA. In the bit line bonding area BLBA, the bit line 1360c may be electrically connected to the circuit elements 1220c that provide a page buffer 1393 in the peripheral circuit region PERI. As one example, the bit line 1360c may be connected to an upper bonding metal 1371c and 1372c in the peripheral circuit region PERI, and the upper bonding metal 1371c and 1372c may be connected to a lower bonding metal 1271c and 1272c connected to the circuit elements 1220c of the page buffer 1393.

In the word line bonding area WLBA, the word lines 1330 may extend along the first direction x parallel to the top surface of the second substrate 1310, and may be connected to a plurality of cell contact plugs 1340 (1341 to 1347). The word lines 1330 and the cell contact plugs 1340 may be connected to each other in pads provided by at least some of the word lines 1330 extending with different lengths along the first direction x. A first metal layer 1350b and a second metal layer 1360b may be sequentially connected to the top portions of the cell contact plugs 1340 connected to the word lines 1330. In the word line bonding area WLBA, the cell contact plugs 1340 may be connected to the peripheral circuit region PERI through the upper bonding metals 1371b and 1372b of the cell region CELL and the lower bonding metals 1271b and 1272b of the peripheral circuit region PERI.

The cell contact plugs 1340 may be electrically connected to the circuit elements 1220b that provide a row decoder 1394 in the peripheral circuit region PERI. In one embodiment, the operating voltage of the circuit elements 1220b providing the row decoder 1394 may be different from the operating voltage of the circuit elements 1220c providing the page buffer 1393. As one example, the operating voltage of the circuit elements 1220c providing the page buffer 1393 may be greater than the operating voltage of the circuit elements 1220b providing the row decoder 1394.

A common source line contact plug 1380 may be disposed in the external pad bonding area PA. The common source line contact plug 1380 may be formed of a conductive material such as a metal, a metal compound, or polysilicon, and may be electrically connected to the common source line 1320. A first metal layer 1350a and a second metal layer 1360a may be sequentially stacked on the common source line contact plug 1380. As one example, an area in which the common source line contact plug 1380, the first metal layer 1350a, and the second metal layer 1360a are disposed may be defined as the external pad bonding area PA.

Meanwhile, input/output pads 1205 and 1305 may be disposed in the external pad bonding area PA. Referring to FIG. 6, below the first substrate 1210, a lower insulating layer 1201 may be formed to cover the bottom surface of the first substrate 1210, and a first input/output pad 1205 may be formed on the lower insulating layer 1201. The first input/output pad 1205 may be connected to at least one of the plurality of circuit elements 1220a, 1220b, and 1220c disposed in the peripheral circuit region PERI through a first input/output contact plug 1203, and may be separated from the first substrate 1210 by the lower insulating layer 1201.

In addition, a side insulating layer may be disposed between the first input/output contact plug 1203 and the first substrate 1210 to electrically separate the first input/output contact plug 1203 from the first substrate 1210.

With continued reference to FIG. 6, an upper insulating layer 1301 may be formed on the second substrate 1310 to cover the top surface of the second substrate 1310, and a second input/output pad 1305 may be disposed on the upper insulating layer 1301. The second input/output pad 1305 may be connected to at least one of the plurality of circuit elements 1220*a*, 1220*b*, and 1220*c* disposed in the peripheral circuit region PERI through a second input/output contact plug 1303.

According to embodiments, the second substrate 1310, the common source line 1320, and the like may not be disposed in an area where the second input/output contact plug 1303 is disposed. In addition, the second input/output pad 1305 may not overlap the word lines 1330 in the third direction z. Referring to FIG. 6, the second input/output contact plug 1303 may be separated from the second substrate 1310 in a direction parallel to the top surface of the second substrate 1310, and may penetrate an interlayer insulating layer 1315 of the cell region CELL to be connected to the second input/output pad 1305.

According to embodiments, the first input/output pad 1205 and the second input/output pad 1305 may be selectively formed. For example, the nonvolatile memory 300 according to some embodiments may include only the first input/output pad 1205 disposed below the first substrate 1210, or only the second input/output pad 1305 disposed above the second substrate 1310. Alternatively, the nonvolatile memory 300 may include both the first input/output pad 1205 and the second input/output pad 1305.

In each of the external pad bonding area PA and the bit line bonding area BLBA included in each of the cell region CELL and the peripheral circuit region PERI, an uppermost metal layer may have a metal pattern existing as a dummy pattern, or may be empty.

In the external pad bonding area PA of the nonvolatile memory 300 according to some embodiments, corresponding to an upper metal pattern 1372*a* formed on an uppermost metal layer of the cell region CELL, a lower metal pattern 1273*a* having the same shape as the upper metal pattern 1372*a* of the cell region CELL may be formed in an uppermost metal layer of the peripheral circuit region PERI. The lower metal pattern 1273*a* formed on the uppermost metal layer of the peripheral circuit region PERI may not be connected to a separate contact in the peripheral circuit region PERI. The upper metal pattern 1372*a* may be electrically connected to upper bonding metal 1371*a* by a bonding method. The upper bonding metal 1371*a* may be electrically connected to second metal layer 1360*a*.

Similarly, in the external pad bonding area PA, corresponding to the lower metal pattern 1272*a* formed on the uppermost metal layer of the peripheral circuit region PERI, the upper metal pattern 1373*a* having the same shape as the lower metal pattern 1273*a* of the peripheral circuit region PERI may be formed in the upper metal layer of the cell region CELL. The upper metal pattern 1373*a* may be electrically connected to second input/output contact plug 1303. Lower bonding metal 1271*a* may be electrically connected to the lower metal pattern 1272*a* by a bonding method. The lower bonding metal 1271*a* may be electrically connected to the first metal layer in the external pad bonding area PA.

The lower bonding metals 1271*b* and 1272*b* may be formed on the second metal layer 1240*b* in the word line bonding area WLBA. In the word line bonding area WLBA, the lower bonding metals 1271*b* and 1272*b* of the peripheral circuit region PERI may be electrically connected to the upper bonding metals 1371*b* and 1372*b* of the cell region CELL by a bonding method.

In addition, in the bit line bonding area BLBA, corresponding to a lower metal pattern 1252 formed in the uppermost metal layer of the peripheral circuit region PERI, an upper metal pattern 1392 having the same shape as the lower metal pattern 1252 of the peripheral circuit region PERI may be formed in the uppermost metal layer of the cell region CELL. A contact may not be formed on the upper metal pattern 1392 formed in the uppermost metal layer of the cell region CELL.

Hereinafter, the electronic device 1 including a garbage collection prediction module 130 will be described with reference to FIGS. 7 and 8.

Figure 7:
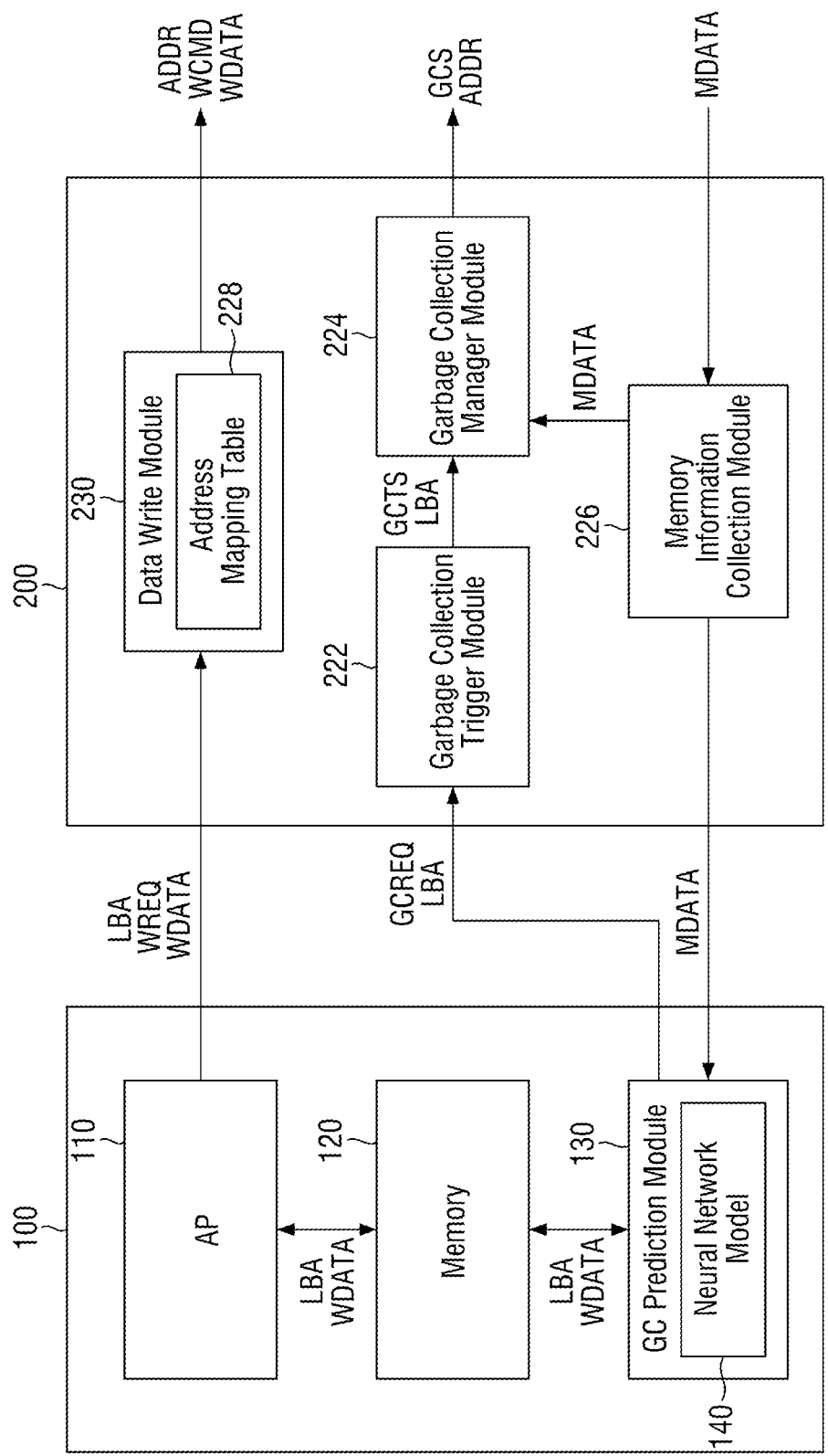
FIG. 7 is a block diagram illustrating an electronic device according to some embodiments.

FIG. 7 is a block diagram illustrating an electronic device according to some embodiments. FIG. 8 is a block diagram illustrating a garbage collection prediction module of FIG. 7.

Referring to FIG. 7, the host 100 may include an application processor 110, a memory 120, and the garbage collection prediction module 130. However, embodiments according to the technical spirit of the present disclosure are not limited thereto, and some configurations may be omitted.

The application processor 110 may control the overall operation of the host 100. For example, the application processor 110 may receive the logical block address LBA and write data WDATA stored in the memory 120. The application processor 110 may transmit the logical block address LBA and the write data WDATA to the memory controller 200 together with a write request signal WREQ. This operation may be calculated and performed by the application processor 110.

The memory 120 may store data to be used in the application processor 110 and the garbage collection prediction module 130. The memory 120 may receive data to temporarily store it, and transmit the data to the application processor 110 and the garbage collection prediction module 130 when the data is required. In addition, the memory 120 may receive and store data from the application processor 110 and the garbage collection prediction module 130.

The garbage collection prediction module 130 may receive the logical block address LBA and the write data WDATA from the memory 120 or the application processor 110. In addition, the garbage collection prediction module 130 may receive metadata MDATA from the memory controller 200.

The garbage collection prediction module 130 may train a neural network model 140 using at least one of the received logical block address LBA, write data WDATA, and metadata MDATA. The garbage collection prediction module 130 may provide a garbage collection request signal GCREQ, the logical block address LBA, and the like to the memory controller 200 based on the trained neural network model 140. A more detailed description of the garbage collection prediction module 130 will be described later.

The memory controller 200 may include a data write module 230, the garbage collection trigger module 222, the garbage collection manager module 224, and the memory information collection module 226.

The data write module 230 may include the address mapping table 228. The data write module 230 may receive the logical block address LBA, the write data WDATA, and the write request signal WREQ from the application processor 110. In response to the write request signal WREQ, the data write module 230 may control the nonvolatile memory 300 to write the write data WDATA to the nonvolatile memory 300.

For example, the data write module 230 may convert the logical block address LBA into the address ADDR based on the address mapping table 228. Here, the address ADDR may be a physical block address. The address mapping table 228 may be changed under the control of the memory controller 200.

The data write module 230 may provide the address ADDR, a write command WCMD, and the write data WDATA to the nonvolatile memory 300. In response to the write command WCMD, the nonvolatile memory 300 may write the write data WDATA to a block of the memory cell array 310 corresponding to the address ADDR. However, embodiments according to the technical spirit of the present disclosure are not limited thereto, and the nonvolatile memory 300 may perform a read operation or an erase operation.

The garbage collection trigger module 222 may receive the garbage collection request signal GCREQ from the host 100 and control the memory controller 200 so that the garbage collection is performed. For example, the garbage collection trigger module 222 may receive the garbage collection request signal GCREQ and the logical block address LBA from the garbage collection prediction module 130.

In response to the garbage collection request signal GCREQ, the garbage collection trigger module 222 may provide a garbage collection trigger signal GCTS and the logical block address LBA to the garbage collection manager module 224. For example, the garbage collection may be performed by the operation of the garbage collection trigger module 222. If the garbage collection trigger module 222 does not transmit the garbage collection trigger signal GCTS to the garbage collection manager module 224, the garbage collection of the memory storage device 10 may not be performed.

The garbage collection manager module 224 may receive the garbage collection trigger signal GCTS from the garbage collection trigger module 222 and in response thereto, may control the nonvolatile memory 300 to perform the garbage collection.

For example, the garbage collection manager module 224 may transmit the address ADDR corresponding to the logical block address LBA to the nonvolatile memory 300 and transmit a garbage collection signal GCS. Here, the garbage collection signal GCS may include a write command and an erase command, but embodiments according to the technical spirit of the present disclosure are not limited thereto.

The nonvolatile memory 300 may perform the garbage collection by the garbage collection manager module 224. For example, a valid page of a block corresponding to the address ADDR may be copied to another block. In addition, the block corresponding to the address ADDR may be erased. The block corresponding to the address ADDR may become a free block, and accordingly, the performance of the memory storage device 10 may be improved.

Here, the garbage collection manager module 224 may receive the metadata MDATA from the memory information collection module 226. The garbage collection manager module 224 may allow the garbage collection to be performed with a small garbage collection cost using the provided metadata MDATA.

The memory information collection module 226 may receive and collect the metadata MDATA from the nonvolatile memory 300. Here, the metadata MDATA may include FTL metadata.

In more detail, the metadata MDATA may indicate the number of free blocks in the nonvolatile memory 300, writable page information of an update block, the number of valid pages, the number of erases of all blocks, the number of valid pages of blocks that manage page mapping, and the like. However, embodiments according to the technical spirit of the present disclosure are not limited thereto, and the metadata MDATA may further include information on the nonvolatile memory 300 after a write operation is performed.

The metadata MDATA may include information on the nonvolatile memory 300 after the write operation is performed in the nonvolatile memory 300 by the write command WCMD. For example, assuming that the number of free blocks included in the nonvolatile memory 300 before the write operation is performed is 100 and the number of free blocks included in the nonvolatile memory 300 after the write operation is performed is 50, the metadata MDATA may include data recording that the number of free blocks has been changed from 100 to 50.

The memory information collection module 226 may provide the metadata MDATA to the garbage collection manager module 224 and the host 100. Here, the metadata MDATA may be processed by the memory controller 200 and then provided to the host 100.

The memory information collection module 226 may provide the metadata MDATA to the garbage collection prediction module 130. Then, the garbage collection prediction module 130 may receive the metadata MDATA that is data for the nonvolatile memory 300 and train the neural network model 140 to predict when the garbage collection should be performed.

Figure 8:
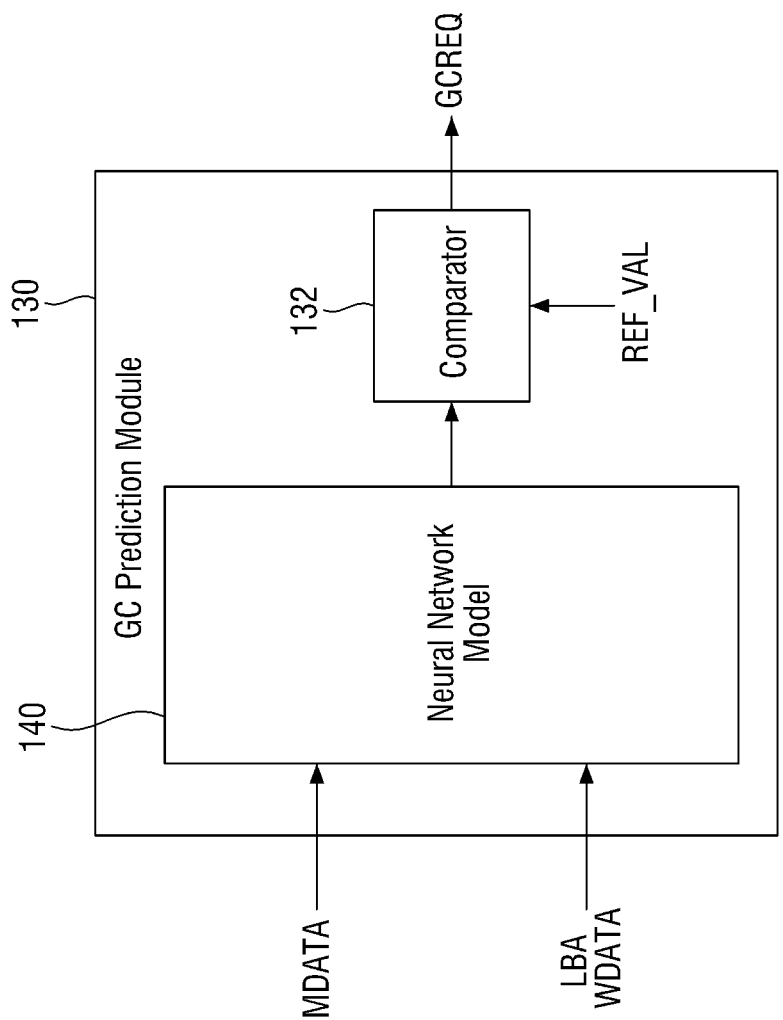
FIG. 8 is a block diagram illustrating a garbage collection prediction module of FIG. 7.

Referring to FIG. 8, the garbage collection prediction module 130 may include the neural network model 140 and a comparator 132. However, embodiments according to the technical spirit of the present disclosure are not limited thereto, and may include other configurations.

The neural network model 140 may receive the metadata MDATA, the logical block address LBA, the write data WDATA, and the like. The neural network model 140 may be trained based on the received metadata MDATA, logical block address LBA, write data WDATA, and the like. Here, the training method of the neural network model 140 may include deep learning, machine learning, or the like.

The garbage collection prediction module 130 may output a garbage collection prediction value using the trained neural network model 140. The comparator 132 may receive the garbage collection prediction value and compare it with a reference value REF_VAL. The comparator 132 may output the garbage collection request signal GCREQ based on the comparison result. For example, when the comparison result does not satisfy a criterion, the comparator 132 may not output the garbage collection request signal GCREQ.

Hereinafter, a garbage collection prediction operation will be described with reference to FIGS. 7 to 10.

Figure 9:
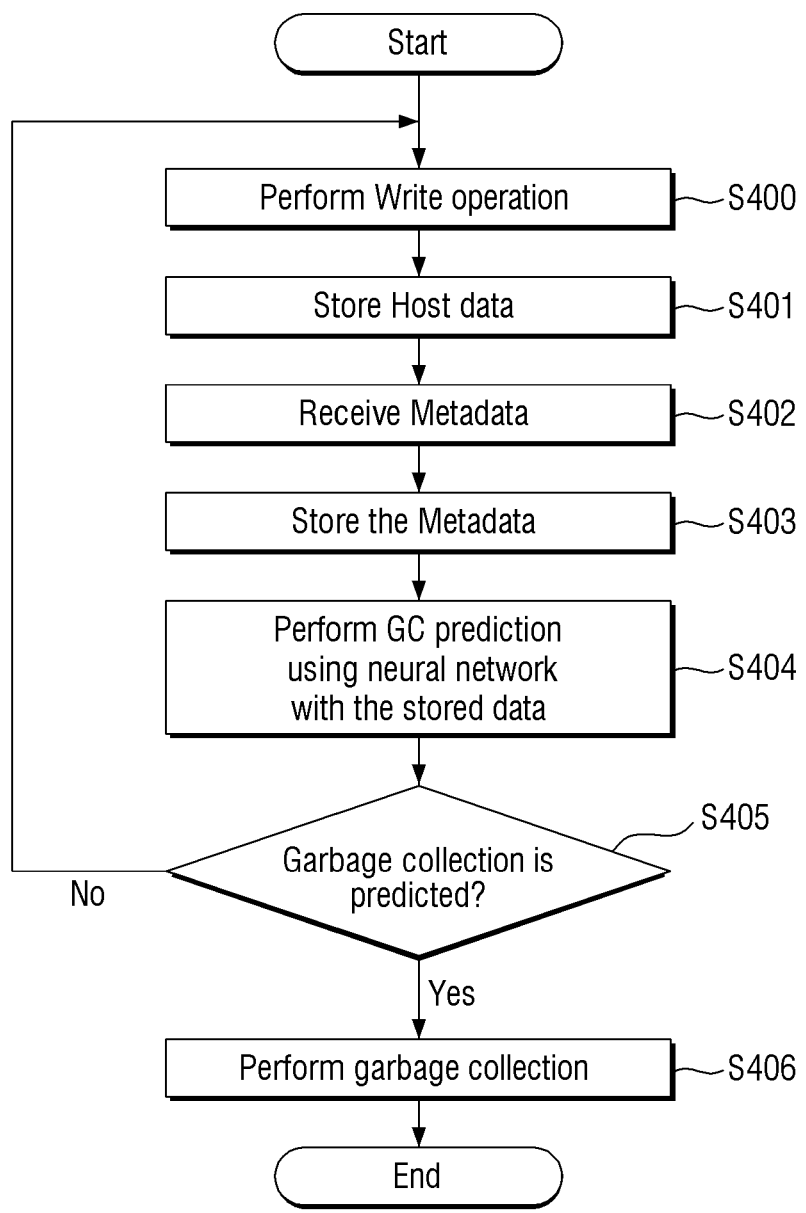
FIG. 9 is a flowchart illustrating a garbage collection prediction operation of an electronic device according to some embodiments.
Figure 10:
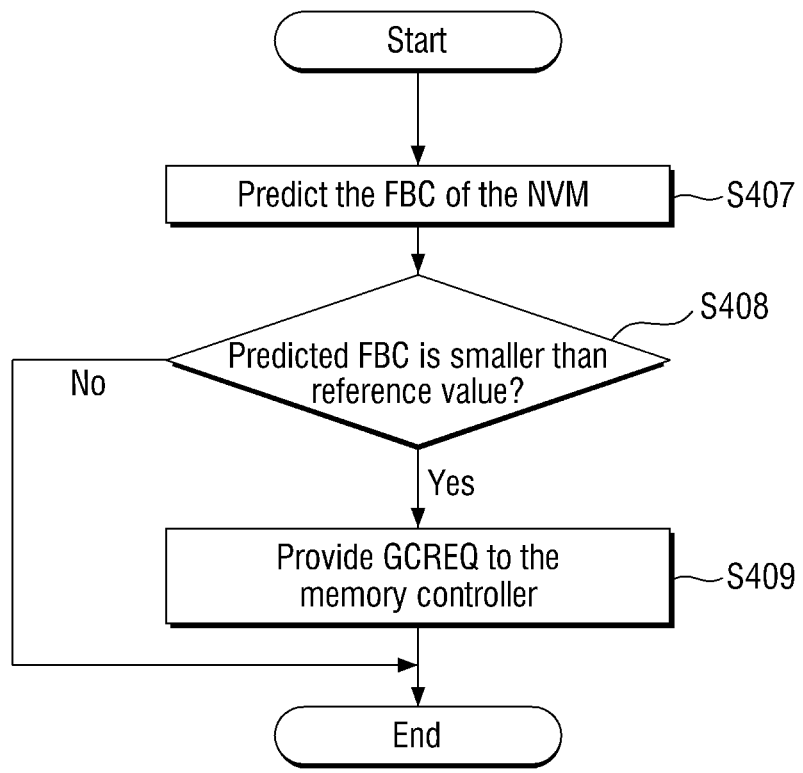
FIG. 10 is a flowchart illustrating the garbage collection prediction operation of FIG. 9 in more detail.

FIG. 9 is a flowchart illustrating a garbage collection prediction operation of an electronic device according to some embodiments. FIG. 10 is a flowchart illustrating the garbage collection prediction operation of FIG. 9 in more detail.

Referring to FIGS. 7 and 9, the memory storage device 10 may perform a write operation (step S400). For example, the address ADDR, the write command WCMD, and the write data WDATA may be transmitted from the memory controller 200 to the nonvolatile memory 300, and the write data WDATA may be written to the nonvolatile memory 300.

Here, the write operation of the memory storage device 10 may be performed multiple times instead of once. For example, the write operation of the memory storage device 10 is not limited to one time and may be performed multiple times for the same address ADDR.

The memory 120 of the host 100 may store host data (step S401). For example, the memory 120 of the host 100 may receive and store the logical block address LBA, the write data WDATA, and the like from the application processor 110. Further, the memory 120 may provide the stored logical block address LBA, write data WDATA, and the like to the garbage collection prediction module 130. For example, the garbage collection prediction module 130 may receive the logical block address LBA, write data WDATA, and the like that have been used in the write operation.

The memory information collection module 226 of the memory controller 200 may receive the metadata MDATA from the nonvolatile memory 300 (step S402). In addition, the garbage collection prediction module 130 of the host 100 may receive and store the metadata MDATA from the memory information collection module 226 (step S403).

The garbage collection prediction module 130 may perform a garbage collection prediction using the neural network model 140 trained with the stored data (step S404). The garbage collection prediction module 130 may train the neural network model 140 using the received logical block address LBA, write data WDATA, metadata MDATA, and the like. For example, the garbage collection prediction module 130 may train the neural network model 140 using the metadata MDATA for the nonvolatile memory 300 after each of a plurality of write operations is performed.

The garbage collection prediction module 130 may determine whether the garbage collection is predicted using the trained neural network model 140 (step S405). If the garbage collection is not predicted (NO in step S405), the steps S400 to S405 may be repeated. If the garbage collection is predicted (YES in step S405), the garbage collection may be performed (step S406). For example, the garbage collection prediction module 130 may transmit the garbage collection request signal GCREQ to the garbage collection trigger module 222, so that the garbage collection is performed.

Refer to FIG. 10 for a more detailed garbage collection prediction operation of the garbage collection prediction module 130. In FIG. 10, it is assumed that only a free block count FBC of the information included in the metadata MDATA is used. However, embodiments according to the technical spirit of the present disclosure are not limited thereto.

Referring to FIG. 10, the garbage collection prediction module 130 may predict the free block count of the nonvolatile memory 300 (step S407). For example, the garbage collection prediction module 130 may predict, at a current time period $t_n$, the free block count of the nonvolatile memory at a future time period $t_{n+1}$ in which a write operation is performed/executed with respect to the nonvolatile memory 300. The current time period $t_n$ occurs subsequent to a past time period $t_{n-i}$ in which one or more write operations have been performed/executed with respect to the nonvolatile memory 300. Specifically, the garbage collection prediction module 130 may train the neural network model using the free block count resulting from previous write operations, and predict the free block count after a subsequent write operation using the trained neural network model. For example, the garbage collection prediction module 130 may output the predicted free block count.

The garbage collection prediction module 130 may determine whether the predicted free block count is smaller than the reference value REF_VAL (step S408).

For example, if the predicted free block count is not smaller than the reference value REF_VAL (NO in step S408), the garbage collection prediction operation may be terminated. The garbage collection prediction module 130 may not provide the garbage collection request signal GCREQ to the memory controller 200.

For example, if the predicted free block count is smaller than the reference value REF_VAL (YES in step S408), the garbage collection prediction module 130 may provide the garbage collection request signal GCREQ to the memory controller 200. Accordingly, the memory storage device 10 may perform the garbage collection. For example, even if a garbage collection condition is not yet satisfied, when a predicted garbage collection condition is satisfied, the garbage collection of the memory storage device 10 may be performed. Accordingly, a load caused by the garbage collection of the memory storage device 10 may be reduced, and the performance of the memory storage device 10 may be improved.

FIGS. 11 to 14 are diagrams illustrating a garbage collection prediction operation using a neural network, according to some embodiments. Here, it is assumed that the garbage collection prediction module 130 uses the free block count FBC of the nonvolatile memory 300 among the metadata MDATA.

Referring to FIG. 11, the free block count FBC of the nonvolatile memory 300 may change over time. For example, after the write operation is performed at time t−3, the free block count FBC of the nonvolatile memory 300 may be 100. For example, after the write operation is performed at time t−2, the free block count FBC of the nonvolatile memory 300 may be 70. For example, after the write operation is performed at time t−1, the free block count FBC of the nonvolatile memory 300 may be 40.

The free block count FBC of the nonvolatile memory 300 in each time period may be, or may be included in, metadata MDATA provided from the nonvolatile memory 300. In addition, a criterion of the free block count FBC for performing the garbage collection may be smaller than 20. For example, when the free block count FBC of the nonvolatile memory 300 is 20 or more, the garbage collection is not performed, and when the free block count FBC of the nonvolatile memory 300 is smaller than 20, the garbage collection may be performed.

Figure 12:
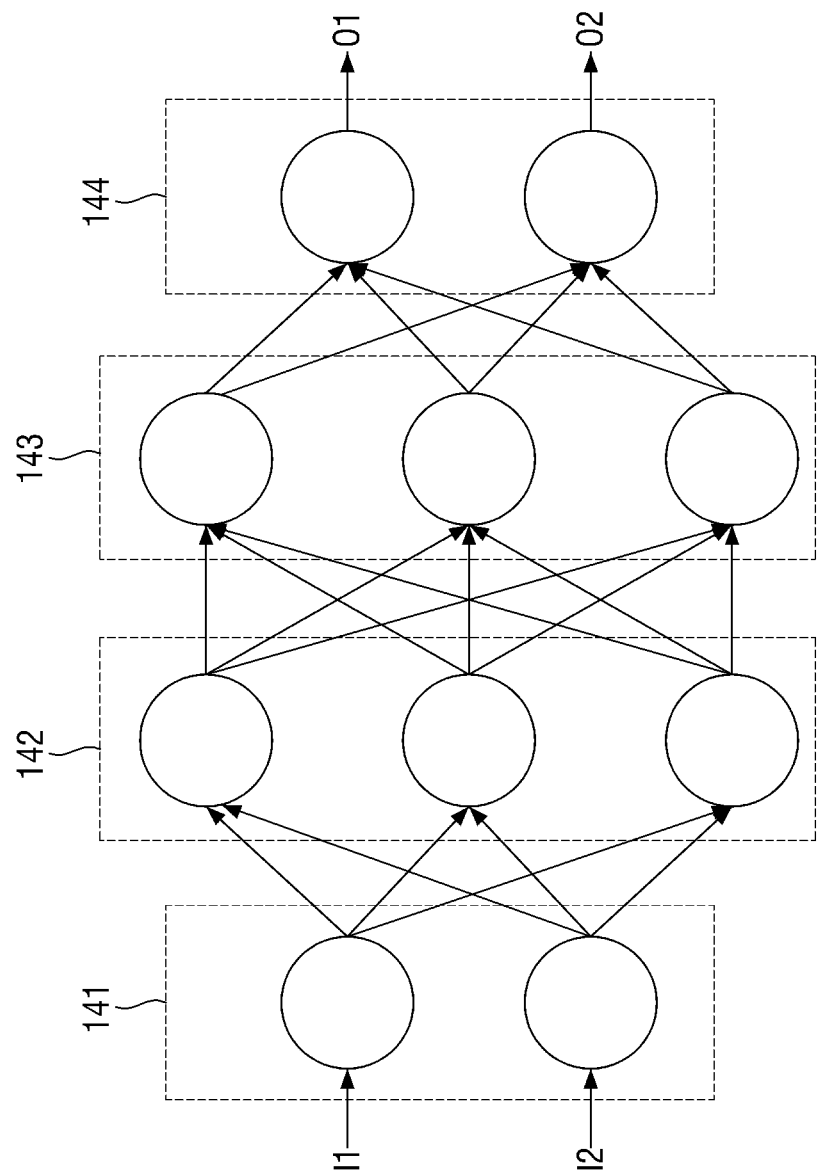

Referring to FIG. 12, the neural network model 140 may include an input layer 141, hidden layers 142 and 143, and an output layer 144. The neural network model 140 may perform computation based on received input data I1 and I2 and generate output data O1 and O2 based on the computation result.

The neural network model 140 may be trained by performing computation based on the input data I1 and I2. In this case, the input data I1 and I2 used for training the neural network model 140 may be training data.

The neural network model 140 may be a deep neural network including two or more hidden layers. The neural network model 140 may include convolutional neural networks (CNN), recurrent neural networks (RNN), deep belief networks, restricted boltzman machines, or the like.

Each of the layers 141, 142, 143, and 144 included in the neural network model 140 may include a plurality of neurons. The neurons may correspond to multiple artificial nodes. For example, the input layer 141 may include two neurons, and each of the hidden layers 142 and 143 may include three neurons. However, embodiments according to the technical spirit of the present disclosure are not limited thereto, and each of the layers included in the neural network model 140 may include various numbers of neurons.

The neurons included in the neural network model 140 may be connected to each other and exchange data. One neuron may receive and compute data from other neurons, and output the computation result to still other neurons.

The input and output of each neuron may be input activation and output activation. For example, the activation may be a parameter that corresponds to not only the output of one neuron but also the input of neurons included in the next layer. Meanwhile, each neuron may determine its own activation based on activations and weights received from neurons included in the previous layer. The weight is a parameter used to calculate the output activation in each neuron, and may be a value assigned to a connection relationship between neurons.

In the neural network model 140, numerous data sets are exchanged between a plurality of interconnected neurons, and undergo numerous computational processes while passing through layers. Meanwhile, the neural network model 140 is trained through such computational processes, and weights and biases may be optimized based thereon.

Figure 13:
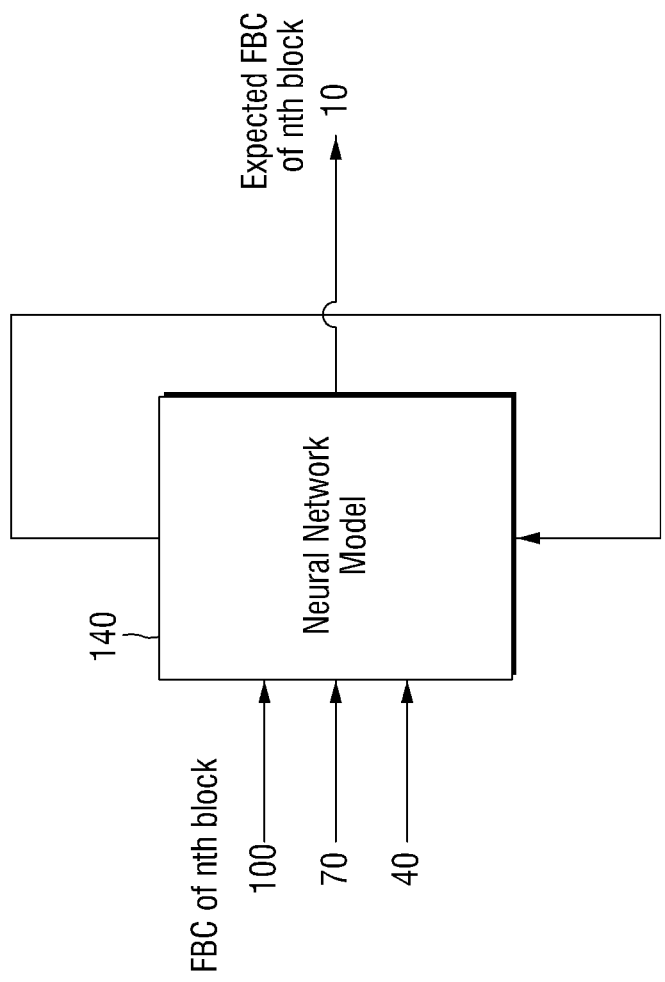

Referring to FIGS. 11 to 14 again, the free block count FBC of the nonvolatile memory 300 in each time period may be an input of the neural network model 140. Referring to FIG. 13, the free block count FBC of the nonvolatile memory 300 at times t−3, t−2, and t−1 may be inputted to the neural network model 140. The neural network model 140 may be trained using the corresponding inputs, and accordingly, the garbage collection prediction module 130 may output a result that the free block count FBC of the nonvolatile memory 300 is predicted to be 10.

Figure 14:
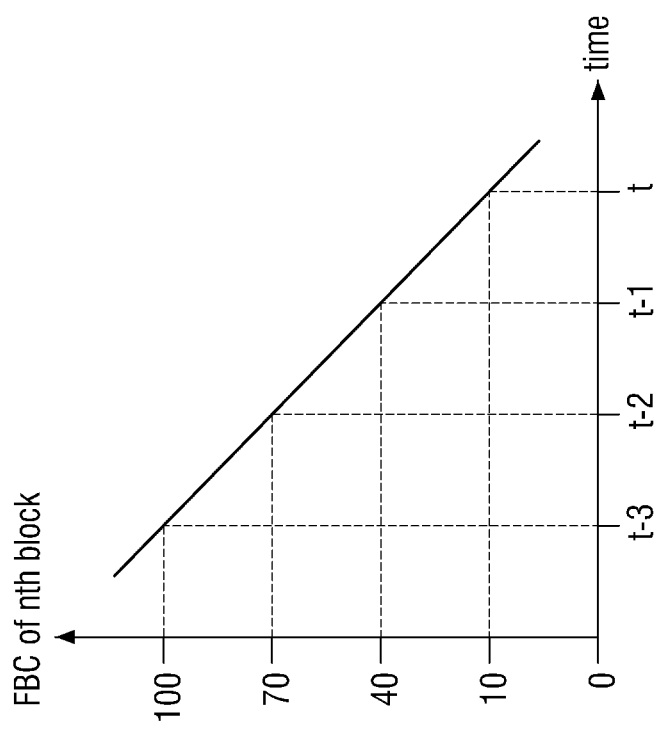

Referring to FIG. 14, the free block count FBC of the nonvolatile memory 300 was 100 at time t−3, 70 at time t−2, and 40 at time t−1.

The neural network model 140 is trained using such data, and as a result, the garbage collection prediction module 130 may output a result that the free block count FBC of the nonvolatile memory 300 is 10 at time t.

For example, a predicted value of the free block count FBC of the nonvolatile memory 300 when the next write operation is performed may be 10. Accordingly, the garbage collection prediction module 130 may compare the reference value REF_VAL of 20 with the predicted value of 10 through the comparator 132. Since the predicted value is smaller than the reference value REF_VAL, the garbage collection prediction module 130 may provide the garbage collection request signal GCREQ to the memory controller 200 so that the garbage collection is performed.

In the above, embodiments according to the technical spirit of the present disclosure have been described using the free block count FBC of the nonvolatile memory 300, but the embodiments are not limited thereto.

By the trained neural network model 140 of the garbage collection prediction module 130, the garbage collection may be performed at a time period when the garbage collection performance criterion is not satisfied. For example, by predicting a time period when the garbage collection is performed, a load caused by the garbage collection may be reduced, and the performance of the memory storage device 10 may be further improved.

Figure 15:
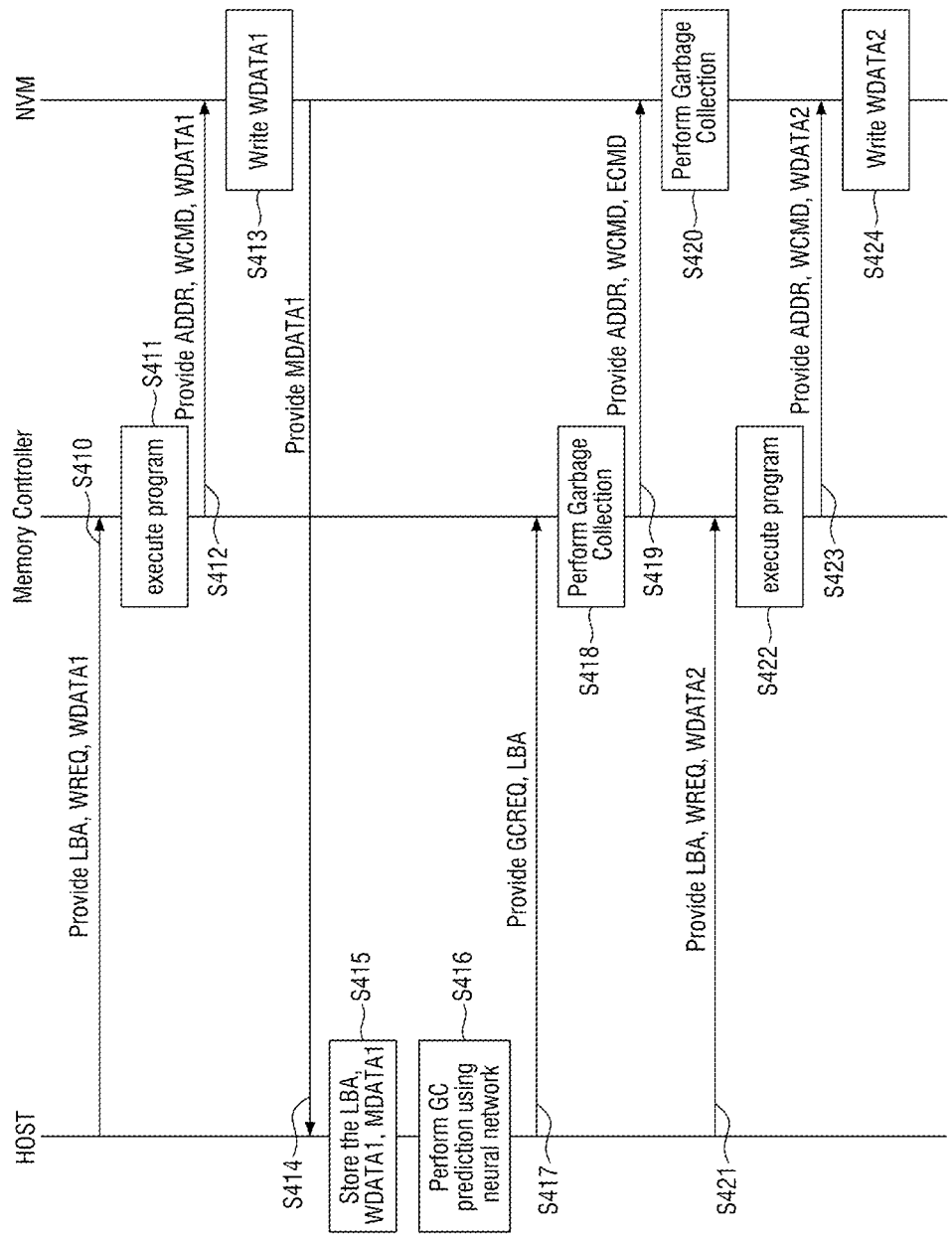
FIG. 15 is a ladder diagram illustrating a garbage collection operation in an electronic device according to some embodiments.

FIG. 15 is a ladder diagram illustrating a garbage collection operation in an electronic device according to some embodiments.

Referring to FIG. 15, the host 100 may provide the logical block address LBA, the write request signal WREQ, and first write data WDATA1 to the memory controller 200 (step S410). The memory controller 200 may execute a program in response to the write request signal WREQ (step S411). The memory controller 200 may provide the address ADDR, the write command WCMD, and the first write data WDATA1 to the nonvolatile memory 300 (step S412). The nonvolatile memory 300 may write the first write data WDATA1 in response to the write command WCMD provided from the memory controller 200 (step S413).

After the first write data WDATA1 is written to the memory cell array 310 of the nonvolatile memory 300, the nonvolatile memory 300 may provide first metadata MDATA1 to the host 100 (step S414). For example, the nonvolatile memory 300 may provide the first metadata MDATA1 to the memory information collection module 226 of the memory controller 200. The memory information collection module 226 of the memory controller 200 may provide the received first metadata MDATA1 to the host 100.

The host 100 may store at least one of the logical block address LBA, the first write data WDATA1, or the first metadata MDATA1 (step S415). In addition, the host 100 may perform garbage collection prediction using the neural network model 140 (step S416). For example, the neural network model 140 may be trained using at least one of the logical block address LBA, the first write data WDATA1, or the first metadata MDATA1. The garbage collection prediction module 130 of the host 100 may output a predicted value using the trained neural network model 140. The garbage collection prediction module 130 may compare the predicted value with the reference value and, if the criterion is satisfied, provide the garbage collection request signal GCREQ and the logical block address LBA to the memory controller 200 (step S417).

The memory controller 200 may perform the garbage collection in response to the garbage collection request signal GCREQ (step S418). For example, the garbage collection manager module 224 may perform the garbage collection for the nonvolatile memory 300 by the garbage collection trigger module 222. Accordingly, the memory controller 200 may provide the address ADDR, the write command WCMD, and an erase command ECMD to the nonvolatile memory 300 (step S419).

In response to the received write command WCMD and erase command ECMD, the nonvolatile memory 300 may copy and erase a valid page of a block corresponding to the address ADDR, thereby performing the garbage collection (step S420).

After the garbage collection of the nonvolatile memory 300 is performed and a certain period of time elapses, the host 100 may provide the logical block address LBA, the write request signal WREQ, and second write data WDATA2 to the memory controller 200 (step S421). Here, the certain time period corresponds to a time period after the garbage collection is performed, and does not necessarily have to be a regular time period. In addition, the second write data WDATA2 may be different from the first write data WDATA1.

The memory controller 200 may execute a program in response to the received write request signal WREQ (step S422). Accordingly, the memory controller 200 may provide the address ADDR, the write command WCMD, and the second write data WDATA2 to the nonvolatile memory 300 (step S423).

The nonvolatile memory 300 may write the second write data WDATA2 in response to the write command WCMD (step S424).

Here, after the first write data WDATA1 is written to the nonvolatile memory 300, the garbage collection is performed to generate a free block, and the second write data WDATA2 may be written to a newly generated free block. Accordingly, a load generated when the garbage collection is performed after the second write data WDATA2 is written may be reduced, and thus the overall performance of the memory storage device 10 may be improved.

Hereinafter, a garbage collection prediction operation using the neural network model 140 trained using a logical block address cumulative count LBA_AC will be described with reference to FIGS. 16 to 18.

Figure 17:
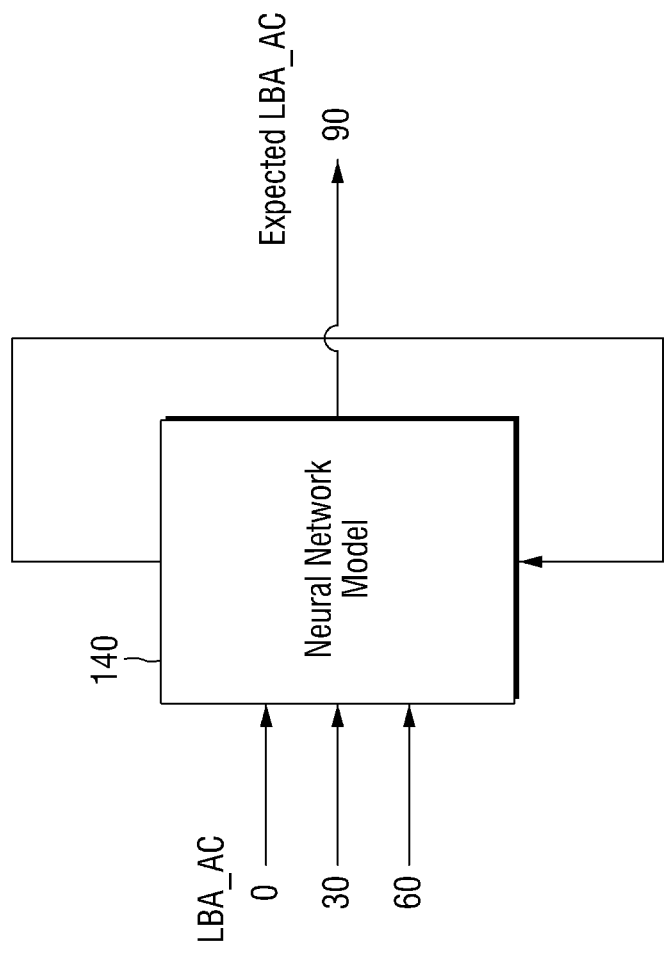
Figure 18:
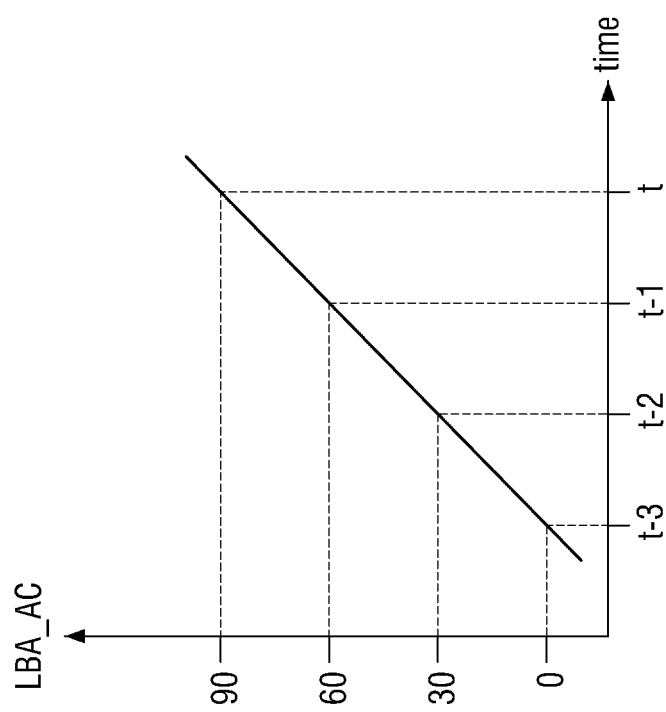

FIGS. 16 to 18 are diagrams illustrating a garbage collection prediction operation using a neural network, according to some embodiments. Here, it is assumed that the garbage collection prediction module 130 uses the logical block address cumulative count LBA_AC.

Referring to FIG. 16, the logical block address cumulative count LBA_AC provided by the host 100 may change over time. For example, after the write operation is performed, the logical block address cumulative count LBA_AC may be 0 at time t−3. For example, after the write operation is performed, the logical block address cumulative count LBA_AC may be 30 at time t−2. For example, after the write operation is performed, the logical block address cumulative count LBA_AC may be 60 at time t−1.

The logical block address cumulative count LBA_AC in each time period may be data derived from the logical block address LBA and the write data WDATA. In addition, a criterion of the logical block address cumulative count LBA_AC for performing the garbage collection may be greater than 80. For example, when the logical block address cumulative count LBA_AC is 80 or less, the garbage collection may not be performed, and when the logical block address cumulative count LBA_AC is greater than 80, the garbage collection may be performed.

The logical block address cumulative count LBA_AC in each time period may be an input of the neural network model 140. Referring to FIG. 17, the logical block address cumulative count LBA_AC at times t−3, t−2, and t−1 may be inputted to the neural network model 140. The neural network model 140 may be trained using the corresponding inputs, and accordingly, the garbage collection prediction module 130 may output a result that the logical block addresses cumulative count LBA_AC of the nonvolatile memory 300 is predicted to be 90.

Referring to FIG. 18, the logical block address cumulative count LBA_AC was 0 at time t−3, 30 at time t−2, and 60 at time t−1.

The neural network model 140 is trained using such data, and as a result, the garbage collection prediction module 130 may output a result that the logical block address cumulative count LBA_AC is 90 at time t.

For example, when the next write operation is performed, a predicted value of the logical block address cumulative count LBA_AC may be 90. Accordingly, the garbage collection prediction module 130 may compare the reference value REF_VAL of 80 with the predicted value of 90 through the comparator 132. Accordingly, since the predicted value is greater than the reference value REF_VAL, the garbage collection predicting module 130 may provide the garbage collection request signal GCREQ to the memory controller 200 so that the garbage collection is performed.

In the above, embodiments according to the technical spirit of the present disclosure have been described using the logical block address cumulative count LBA_AC, but the embodiments are not limited thereto.

By the trained neural network model 140 of the garbage collection prediction module 130, the garbage collection may be performed at a time period when the garbage collection performance criterion is not satisfied. For example, by predicting a time period when the garbage collection is performed, a load caused by the garbage collection may be reduced, and the performance of the memory storage device 10 may be further improved.

Figure 19:
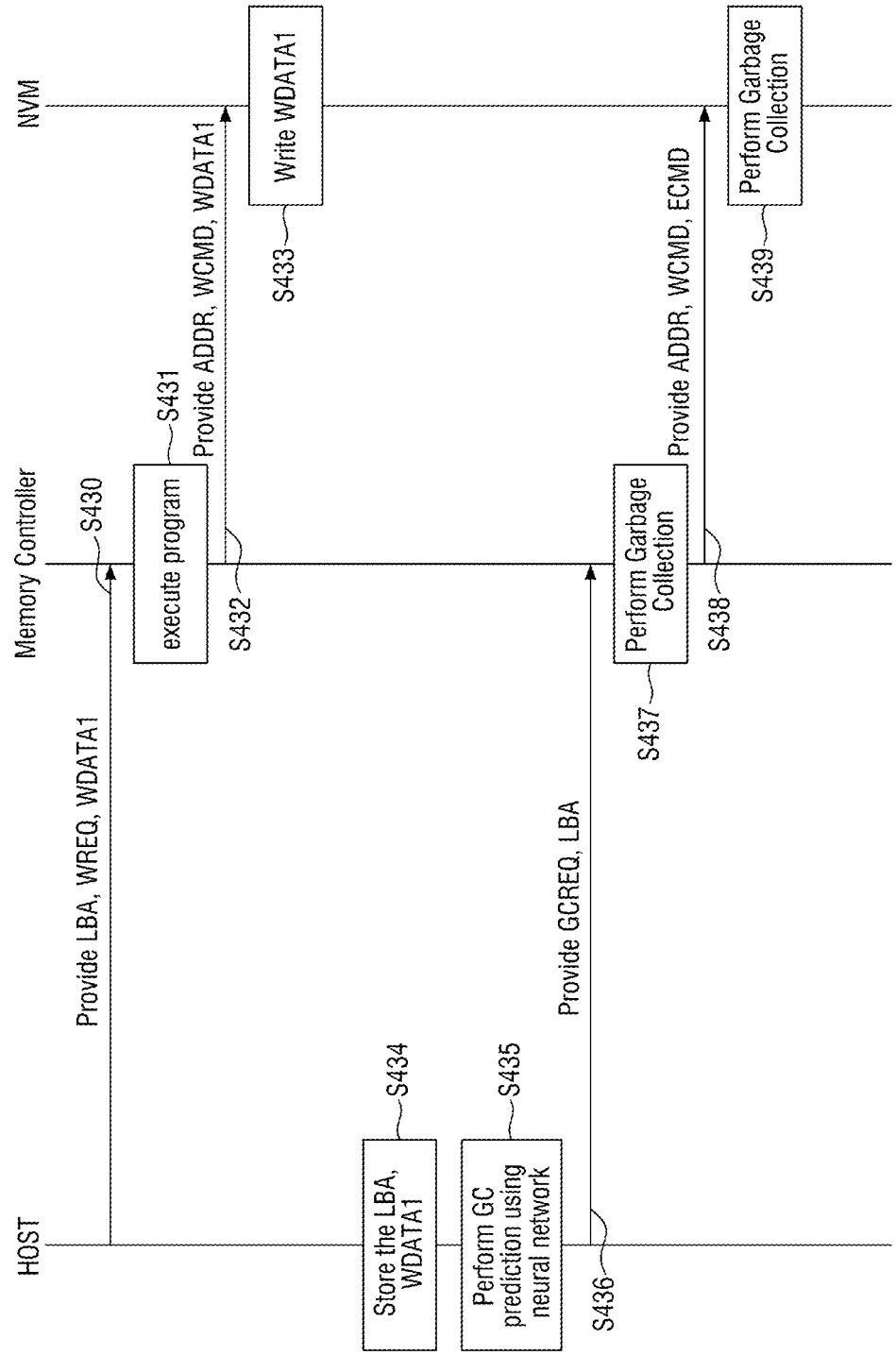
FIG. 19 is a ladder diagram illustrating a garbage collection operation in an electronic device according to some embodiments.

FIG. 19 is a ladder diagram illustrating a garbage collection operation in an electronic device according to some embodiments.

Referring to FIG. 19, the host 100 may provide the logical block address LBA, the write request signal WREQ, and the first write data WDATA1 to the memory controller 200 (step S430). The memory controller 200 may execute a program in response to the write request signal WREQ (step S431). The memory controller 200 may provide the address ADDR, the write command WCMD, and the first write data WDATA1 to the nonvolatile memory 300 (step S432). The nonvolatile memory 300 may write the first write data WDATA1 in response to the write command WCMD provided from the memory controller 200 (step S433).

The host 100 may store at least one of the logical block address LBA or the first write data WDATA1 (step S434). Then, the host 100 may perform garbage collection prediction using the neural network model 140 (step S435). For example, the neural network model 140 may be trained using at least one of the logical block address LBA or the first write data WDATA1. The garbage collection prediction module 130 of the host 100 may output a predicted value using the trained neural network model 140. The garbage collection prediction module 130 may compare the predicted value with the reference value and, if the criterion is satisfied, provide the garbage collection request signal GCREQ and the logical block address LBA to the memory controller 200 (step S436).

The memory controller 200 may perform the garbage collection in response to the garbage collection request signal GCREQ (step S437). For example, the garbage collection manager module 224 may perform the garbage collection for the nonvolatile memory 300 by the garbage collection trigger module 222. Accordingly, the memory controller 200 may provide the address ADDR, the write command WCMD, and the erase command ECMD to the nonvolatile memory 300 (step S438).

In response to the received write command WCMD and erase command ECMD, the nonvolatile memory 300 may copy and erase a valid page of a block corresponding to the address ADDR, thereby performing the garbage collection (step S439).

Figure 21:
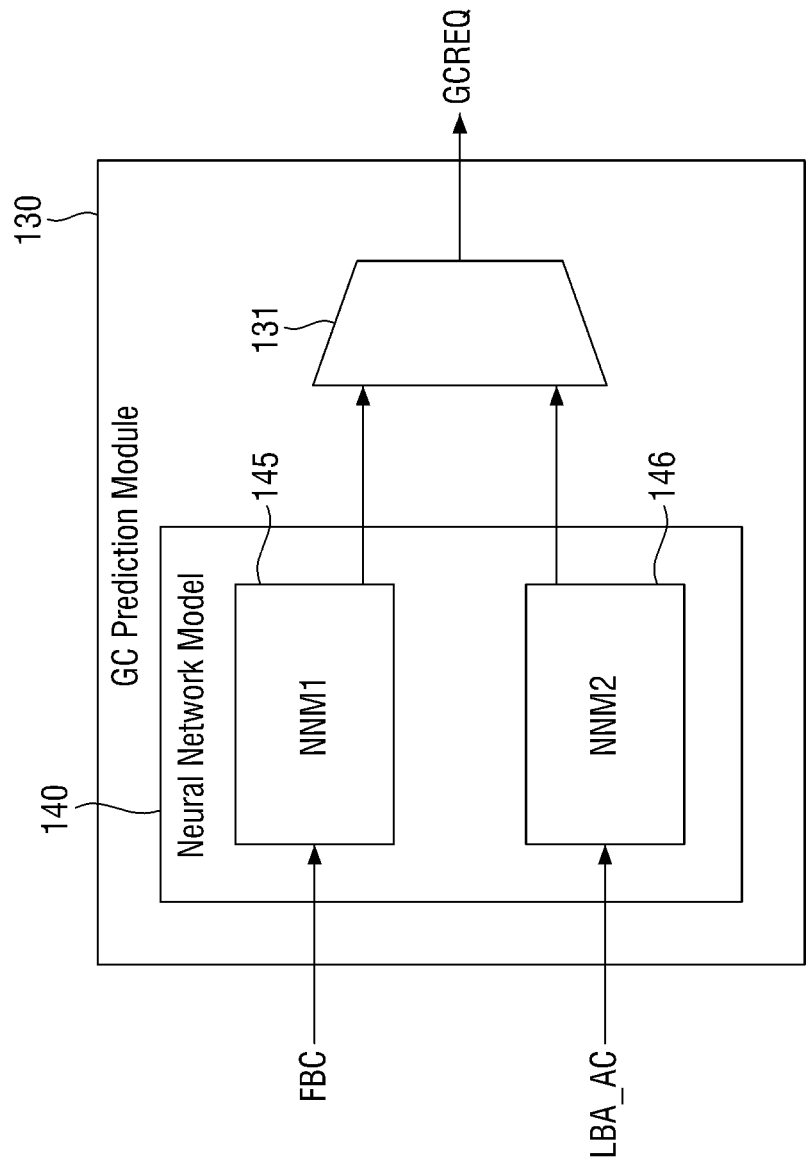

FIGS. 20 and 21 are diagrams illustrating a garbage collection prediction operation using a neural network, according to some embodiments.

Referring to FIG. 20, in the case of the $n^{th}$ block, the condition for the free block count FBC of the nonvolatile memory 300 may be satisfied, but the condition for the logical block address cumulative count LBA_AC may not be satisfied.

In the case of the (n+1)$^{th}$ block, both the condition for the free block count FBC of the nonvolatile memory 300 and the condition for the logical block address cumulative count LBA_AC may be satisfied.

In the case of the (n+2)$^{th}$ block, both the condition for the logical block address cumulative count LBA_AC and the condition for the free block count FBC of the nonvolatile memory 300 may not be satisfied.

In this case, if even one condition is satisfied, the garbage collection for the nonvolatile memory 300 may be performed. For example, the garbage collection for the n$^{th}$ block and the (n+1)$^{th}$ block may be performed. However, the garbage collection for the (n+2)th block may not be performed since the condition is not satisfied.

Referring to FIG. 21, the garbage collection prediction module 130 may include the neural network model 140 and a determiner 131. Here, the neural network model 140 may include a first neural network model 145 and a second neural network model 146.

The first neural network model 145 may be trained using the free block count FBC of the nonvolatile memory 300. The second neural network model 146 may be trained using the logical block address cumulative count LBA_AC.

The determiner 131 may receive a result from the first neural network model 145 and the second neural network model 146 and, if at least one condition is satisfied, transmit the garbage collection request signal GCREQ to the memory controller 200. For example, the determiner 131 may output a result according to a table of FIG. 20.

In the present embodiment, the neural network model 140 is described as being trained using only one of the metadata MDATA and the logical block address LBA, but embodiments according to the technical spirit of the present disclosure are not limited thereto. For example, the neural network model 140 may be trained using all of the metadata MDATA, the write data WDATA, and the logical block address LBA.

Hereinafter, the electronic device 1 including the memory controller 200 having a garbage collection prediction module 240 will be described with reference to FIGS. 22 and 23.

Figure 22:
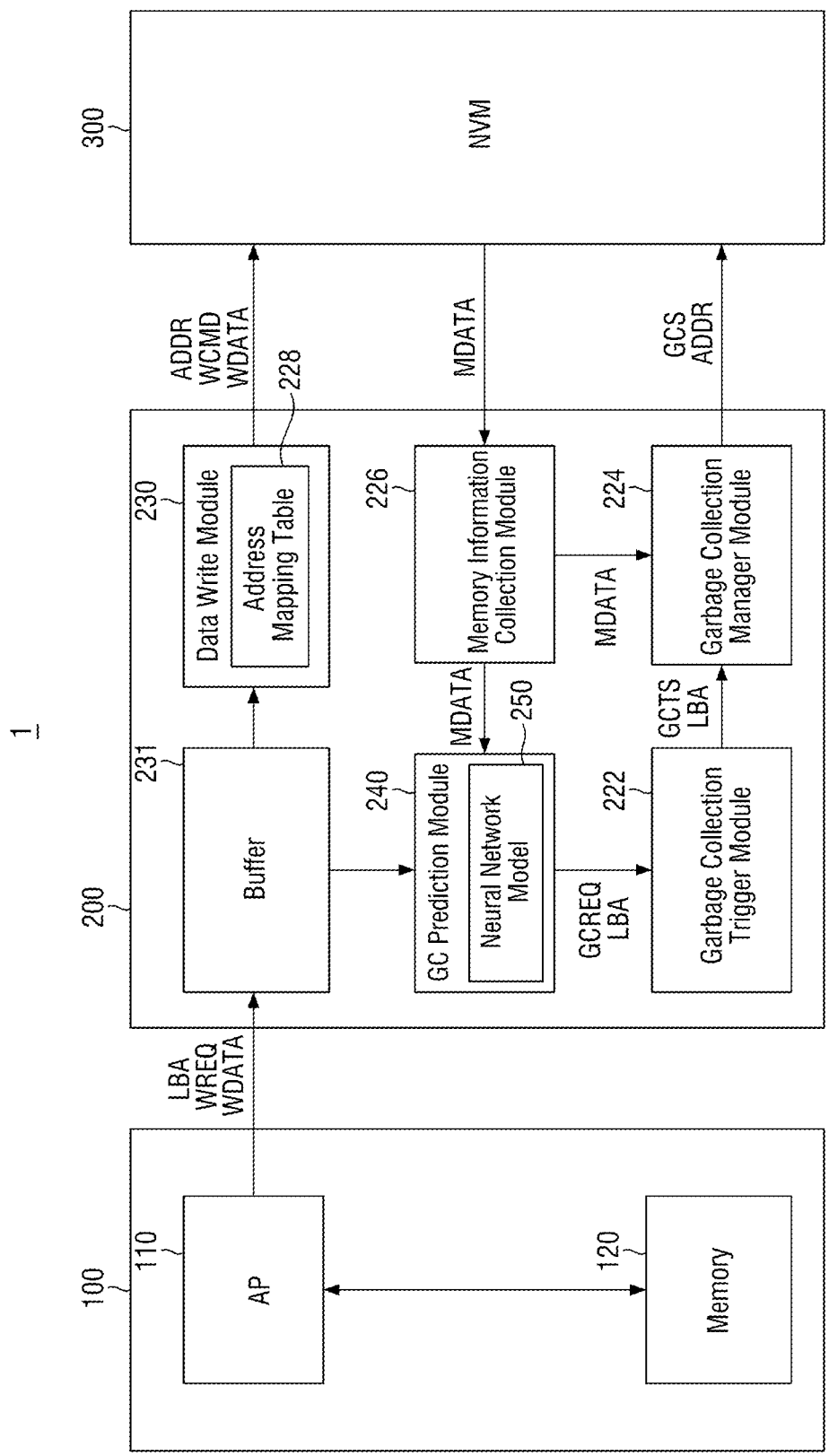
FIG. 22 is a block diagram illustrating an electronic device according to some embodiments.

FIG. 22 is a block diagram illustrating an electronic device according to some embodiments. FIG. 23 is a ladder diagram illustrating a garbage collection operation in the electronic device of FIG. 22. For simplicity of description, a description overlapping with the description with reference to FIGS. 1 to 21 will be briefly given or omitted.

Referring to FIG. 22, the host 100 may include the application processor 110 and the memory 120. The memory controller 200 may include a buffer 231, the data write module 230, the garbage collection trigger module 222, the garbage collection manager module 224, the memory information collection module 226, and the garbage collection prediction module 240. For example, in the present embodiment, the host 100 may not include the garbage collection prediction module 240, but the memory controller 200 may include the garbage collection prediction module 240.

The application processor 110 may provide the logical block address LBA, the write request signal WREQ, and the write data WDATA to the buffer 231. The buffer 231 may temporarily store the received logical block address LBA, write request signal WREQ, and write data WDATA. The buffer 231 may provide the stored logical block address LBA, write request signal WREQ, and write data WDATA to the data write module 230. Further, the buffer 231 may provide the stored logical block address LBA and write data WDATA to the garbage collection prediction module 240.

The garbage collection prediction module 240 included in the memory controller 200 may be the same as the garbage collection prediction module 130 described above. For example, the garbage collection prediction module 240 may predict a time period when the garbage collection is performed using a trained neural network model 250.

The garbage collection prediction module 240 may receive the logical block address LBA, the write data WDATA, and the metadata MDATA, and train the neural network model 250 using at least one of the logical block address LBA, the write data WDATA, or the metadata MDATA.

If a result value predicted by the trained neural network model 250 satisfies a specific condition, the garbage collection prediction module 240 may provide the garbage collection request signal GEREQ and the logical block address LBA to the garbage collection trigger module 222. Accordingly, the memory controller 200 may perform the garbage collection for the nonvolatile memory 300.

Figure 23:
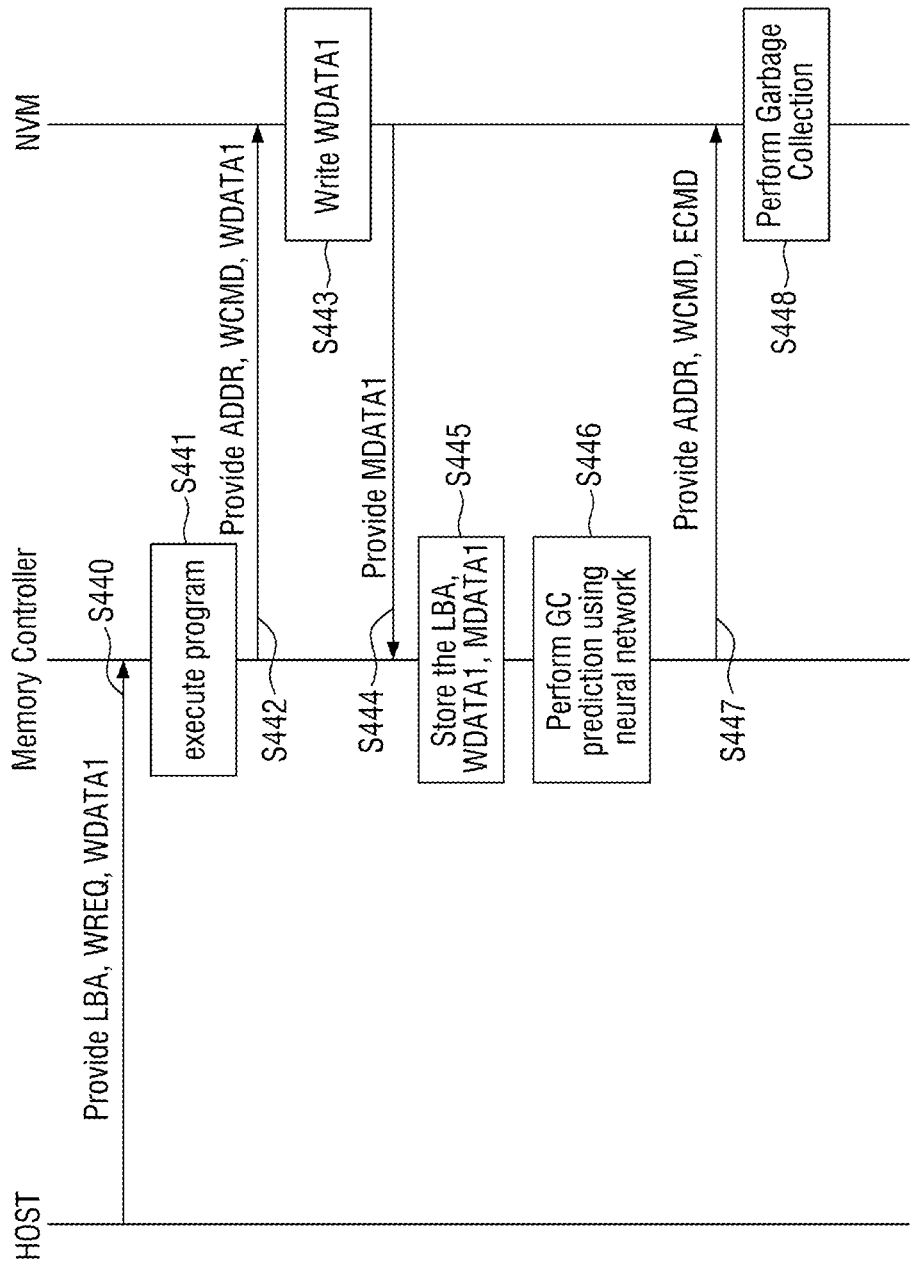
FIG. 23 is a ladder diagram illustrating a garbage collection operation in the electronic device of FIG. 22.

Referring to FIG. 23, the host 100 may provide the logical block address LBA, the write request signal WREQ, and the first write data WDATA1 to the memory controller 200 (step S440). The memory controller 200 may execute a program in response to the write request signal WREQ (step S441). The memory controller 200 may provide the address ADDR, the write command WCMD, and the first write data WDATA1 to the nonvolatile memory 300 (step S442). The nonvolatile memory 300 may write the first write data WDATA1 in response to the write command WCMD provided from the memory controller 200 (step S443).

After the first write data WDATA1 is written to the memory cell array 310 of the nonvolatile memory 300, the nonvolatile memory 300 may provide the first metadata MDATA1 to the host 100 (step S444). For example, the nonvolatile memory 300 may provide the first metadata MDATA1 to the memory information collection module 226 of the memory controller 200. The memory information collection module 226 of the memory controller 200 may provide the received first metadata MDATA1 to the garbage collection prediction module 240 of the memory controller 200.

The garbage collection prediction module 240 may store the logical block address LBA, the first write data WDATA1, and the first metadata MDATA1 (step S445). The garbage collection prediction module 240 may perform garbage collection prediction by using the neural network model 250 trained using at least one of the logical block address LBA, the first write data WDATA1, or the first metadata MDATA1 (step S446).

The garbage collection prediction module 240 may output a predicted value using the trained neural network model 250. The garbage collection prediction module 240 may compare the predicted value with the reference value and, if the criterion is satisfied, provide the address ADDR, the write command WCMD, and the erase command ECMD to the nonvolatile memory 300 (step S447).

The nonvolatile memory 300 may receive the address ADDR, the write command WCMD, and the erase command ECMD to perform the garbage collection for the memory cell array 310 (step S448).

In the present embodiment, unlike the host 100 including the garbage collection prediction module 130 in the other embodiments described above, the memory controller 200 may include the garbage collection prediction module 240. For example, even if a signal such as the metadata MDATA is not transmitted to the host 100, the garbage collection prediction may be performed by the memory controller 200 itself Hereinafter, the electronic device 1 including the host 100 having the application processor 110 will be described with reference to FIG. 24.

Figure 24:
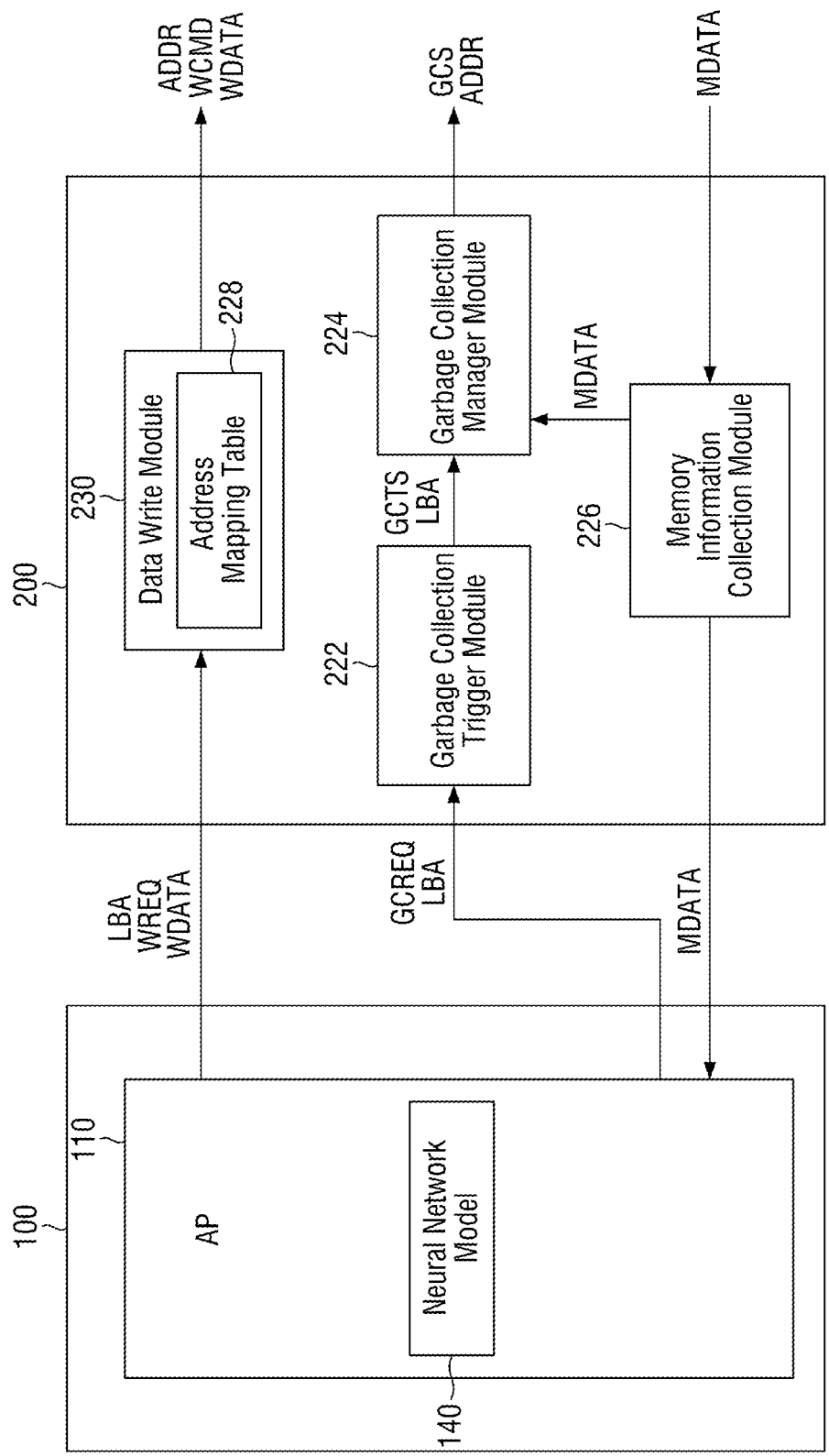
FIG. 24 is a block diagram illustrating an electronic device according to some embodiments.

FIG. 24 is a block diagram illustrating an electronic device according to some embodiments. For simplicity of description, a description overlapping with the description with reference to FIGS. 1 to 21 will be briefly given or omitted.

Referring to FIG. 24, the host 100 may include the application processor 110. The application processor 110 may include the neural network model 140. For example, unlike the electronic device 1 described with reference to FIGS. 1 to 21, the host 100 may not include the memory 120 and the garbage collection prediction module 130.

For example, the application processor 110 may perform the function of the garbage collection prediction module 130 instead. In addition, the functions of the memory 120 and the garbage collection prediction module 130 may be implemented only by the application processor 110.

The application processor 110 may provide the logical block address LBA, the write request signal WREQ, and the write data WDATA to the memory controller 200. The application processor 110 may receive the metadata MDATA from the memory controller 200 to train the neural network model 140. When a specific garbage collection execution condition is satisfied, the application processor 110 may provide the garbage collection request signal GCREQ and the logical block address LBA to the memory controller 200, using the trained neural network model 140.

Hereinafter, an electronic device 2 including a plurality of nonvolatile memories 301, 302, and 303 will be described with reference to FIG. 25.

Figure 25:
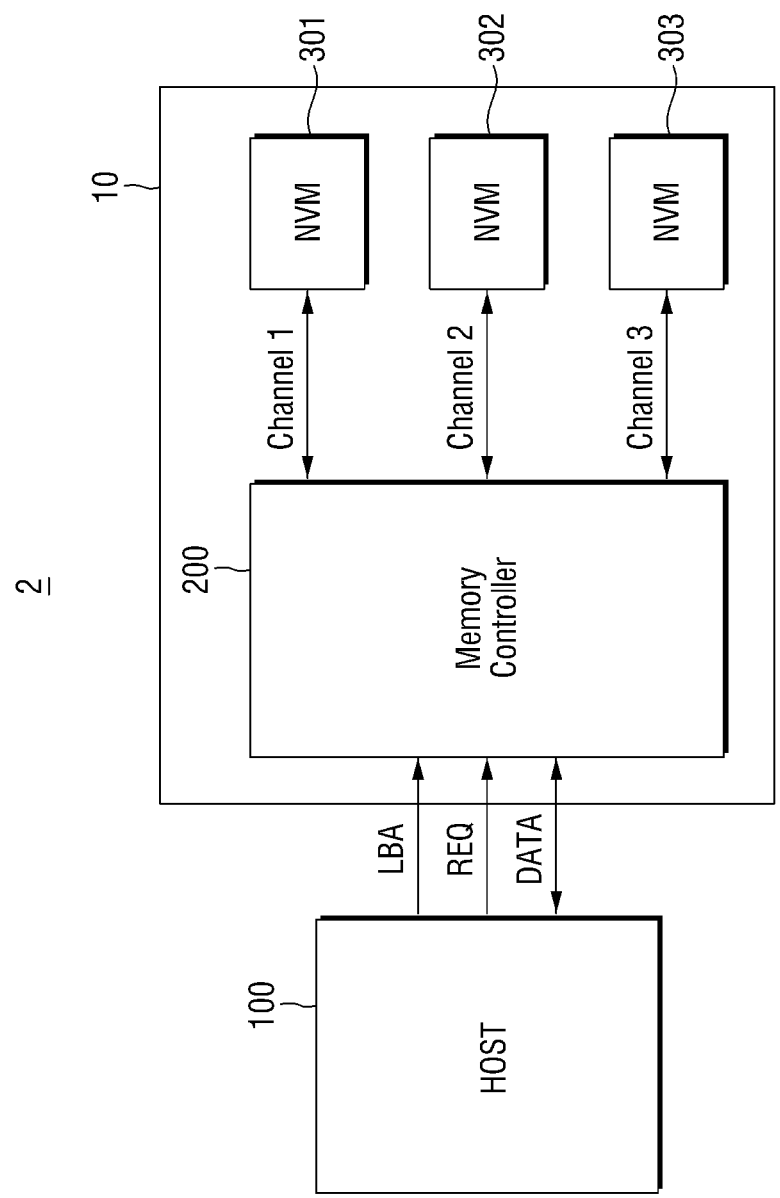
FIG. 25 is a block diagram illustrating an electronic device according to some embodiments.

FIG. 25 is a block diagram illustrating an electronic device according to some embodiments. For simplicity of description, a description overlapping with the description with reference to FIGS. 1 to 24 will be briefly given or omitted.

Referring to FIG. 25, the memory storage device 10 may include the plurality of nonvolatile memories 301, 302, and 303 connected to the memory controller 200.

Each of the nonvolatile memories 301, 302, and 303 may be substantially the same as the nonvolatile memory 300 described with reference to FIG. 3. For example, each of the nonvolatile memories 301, 302, and 303 may include the memory cell array 310, the address decoder 320, the voltage generator 330, the read/write circuit 340, the control logic 350, and the like.

The memory controller 200 and the nonvolatile memory 301 may be connected through a first channel 1. The memory controller 200 and the nonvolatile memory 302 may be connected through a second channel 2. The memory controller 200 and the nonvolatile memory 303 may be connected through a third channel 3.

The garbage collection prediction module 130 described with reference to FIGS. 1 to 21 may be included in the host 100. For example, the garbage collection prediction module 130 included in the host 100 may train the neural network model 140 using the metadata MDATA transmitted from each of the nonvolatile memories 301, 302, and 303. In addition, the trained neural network model 140 may be used to predict a time period when the garbage collection is performed for each of the nonvolatile memories 301, 302, and 303.

The garbage collection prediction module 240 described with reference to FIGS. 22 and 23 may be included in the memory controller 200. For example, the garbage collection prediction module 240 included in the memory controller 200 may train the neural network model 250 using the metadata MDATA transmitted from each of the nonvolatile memories 301, 302, and 303. In addition, the trained neural network model 250 may be used to predict a time period when the garbage collection is performed for each of the nonvolatile memories 301, 302, and 303.

In concluding the detailed description, those skilled in the art will appreciate that many variations and modifications can be made to the preferred embodiments without substantially departing from the principles of the present disclosure. Therefore, the disclosed preferred embodiments of the invention are used in a generic and descriptive sense only and not for purposes of limitation.

What is claimed is:

1. An electronic device comprising:
a nonvolatile memory;
a memory controller configured to control the nonvolatile memory; and
a host connected to the memory controller,
wherein in response to a first write signal received from the host, the memory controller is configured to provide the first write signal to the nonvolatile memory,
the nonvolatile memory is configured to perform a first write operation based on the provided first write signal, generate first metadata based on a result of performing the first write operation, and provide the generated first metadata to the host,
the host is configured to determine whether to perform garbage collection for the nonvolatile memory using a neural network model trained based on the provided first metadata or the first write signal, and
the host is configured to provide a garbage collection request signal to the memory controller in response to determining to perform garbage collection.

2. The electronic device of claim 1, wherein the determining of whether to perform garbage collection for the nonvolatile memory using the neural network model comprises predicting, based on the number of free blocks of the nonvolatile memory indicated by the first metadata, the number of free blocks of the nonvolatile memory subsequent to performing a second write operation and determining whether to perform garbage collection based on the predicted number of free blocks.

3. The electronic device of claim 1, wherein the first metadata indicates the number of free blocks of the nonvolatile memory subsequent to performing the first write operation.

4. The electronic device of claim 3, wherein in response to a second write signal received from the host and following the first write signal, the memory controller is configured to provide the second write signal to the nonvolatile memory,
the nonvolatile memory is configured to perform a second write operation based on the provided second write signal, generate second metadata based on a result of performing the second write operation, and provide the generated second metadata to the host, and
the second metadata indicates the number of free blocks of the nonvolatile memory subsequent to performing the second write operation.

5. The electronic device of claim 4, wherein the host is configured to predict, using a neural network model trained based on the number of free blocks of the nonvolatile memory indicated by the provided first metadata and the number of free blocks of the nonvolatile memory indicated by the provided second metadata, the number of free blocks of the nonvolatile memory subsequent to performing a third write operation based on a third write signal following the second write signal.

6. The electronic device of claim 5, wherein the host is configured to determine to perform the garbage collection when the predicted number of free blocks of the nonvolatile memory is smaller than a reference value.

7. The electronic device of claim 1, wherein the determining of whether to perform garbage collection for the nonvolatile memory using the neural network model comprises predicting, based on a logical block address and write data included in the first write signal, a cumulative count of logical block addresses of the nonvolatile memory subsequent to performing a second write operation and determining whether to perform garbage collection based on the predicted cumulative count of logical block addresses.

8. The electronic device of claim 7, wherein the determining of whether to perform garbage collection based on the predicted cumulative count of logical block addresses comprises providing the garbage collection request signal to the memory controller when the predicted cumulative count of logical block addresses is greater than a reference value.

9. The electronic device of claim 1, wherein the garbage collection request signal is provided between a plurality of write signals provided from the host to the memory controller.

10. The electronic device of claim 1, wherein the memory controller includes a garbage collection trigger module and a garbage collection manager module, and
the garbage collection trigger module provides a garbage collection trigger signal to the garbage collection manager module in response to the garbage collection request signal provided from the host.

11. The electronic device of claim 10, wherein the garbage collection manager module provides a write command and an erase command to the nonvolatile memory in response to the provided garbage collection trigger signal.

12. A memory storage device comprising:
a nonvolatile memory; and
a memory controller configured to control the nonvolatile memory,
wherein the memory controller is configured to provide a first write command, an address and data to the nonvolatile memory,
the memory controller is configured to receive metadata from the nonvolatile memory in response to the first write command,
the memory controller is configured to determine whether to perform garbage collection for the nonvolatile memory using a neural network model trained based on the received metadata, and
the memory controller is configured to provide a second write command, an erase command, and the address to the nonvolatile memory in response to determining to perform garbage collection.

13. The memory storage device of claim 12, wherein the metadata indicates the number of free blocks of the nonvolatile memory.

14. The memory storage device of claim 13, wherein the determining of whether to perform garbage collection for the nonvolatile memory using the neural network model comprises predicting the number of free blocks of the nonvolatile memory subsequent to providing the second write command, and comparing the predicted number of free blocks of the nonvolatile memory with a reference value to determine whether to perform garbage collection.

15. The memory storage device of claim 12, wherein the memory controller includes a garbage collection trigger module and a garbage collection manager module, and
the garbage collection trigger module provides a garbage collection trigger signal to the garbage collection manager module in response to the determination on whether to perform garbage collection.

16. The memory storage device of claim 15, wherein the garbage collection manager module provides the second write command, the erase command, and the address to the nonvolatile memory in response to the provided garbage collection trigger signal.

17. The memory storage device of claim 12, wherein the memory controller is connected to a host, receives the first write command, a logical block address, and the data from the host, and provides the received first write command, the address based on the logical block address, and the data to the nonvolatile memory.

18. The memory storage device of claim 17, wherein the memory controller determines whether to perform garbage collection for the nonvolatile memory using a neural network model trained based on the logical block address and the data.

19. An electronic device comprising:
a nonvolatile memory;
a memory controller configured to control the nonvolatile memory; and
a host connected to the memory controller,
wherein in response to a first write signal received from the host, the memory controller is configured to provide the first write signal to the nonvolatile memory,
the nonvolatile memory is configured to perform a write operation based on the provided first write signal, generate metadata based on a result of performing the write operation, and provide the generated metadata to the host,
the metadata indicates the number of free blocks included in the nonvolatile memory and the host is configured to determine whether to perform garbage collection for the nonvolatile memory using a neural network model trained based on the metadata, and
the host is configured to provide a garbage collection request signal to the memory controller in response to determining to perform garbage collection.

20. The electronic device of claim 19, wherein the memory controller is configured to perform garbage collection for the nonvolatile memory in response to the provided garbage collection request signal, and
after the garbage collection is performed, the memory controller is configured to provide a second write signal different from the first write signal to the nonvolatile memory.

* * * * *